United States Patent [19]

McLaughlin

[11] Patent Number: 4,520,451

[45] Date of Patent: May 28, 1985

[54] PROGRAMMABLE VENDING MACHINE ACCOUNTABILITY APPARATUS

[75] Inventor: Donald L. McLaughlin, Newton Square, Pa.

[73] Assignee: Mars Incorporated, McLean, Va.

[21] Appl. No.: 307,183

[22] Filed: Sep. 30, 1981

[51] Int. Cl.[3] .......................... G06F 9/00; G06F 13/00

[52] U.S. Cl. ...................................................... 364/900

[58] Field of Search ................................ 364/200, 900

[56] References Cited

U.S. PATENT DOCUMENTS

| | | | |
|---|---|---|---|
| 4,201,907 | 5/1980 | Otten | 235/92 AC |
| 4,216,461 | 8/1980 | Werth et al. | 340/149 R |
| 4,272,757 | 6/1981 | McLaughlin et al. | 340/152 R |
| 4,306,219 | 12/1981 | Main et al. | 340/825.54 |
| 4,417,450 | 11/1983 | Martin | 62/126 |

*Primary Examiner*—Gareth D. Shaw

*Assistant Examiner*—John G. Mills

*Attorney, Agent, or Firm*—Davis, Hoxie, Faithfull & Hapgood

[57] ABSTRACT

A programmable accountability apparatus for installation into a vending machine is disclosed. The accountability apparatus comprises a plurality of monitoring wires attachable to points within the vending machine carrying AC signals selected for monitoring, means for converting the AC signals into digital signals, a microprocessor which is programmed to monitor and collect data from the digital signals, and a memory for storing both data collected from the digital signals and data for programming the microprocessor. The data for programming the microprocessor comprises a selected digital word for each monitoring wire which determines whether the occurrence of the AC signal monitored by that wire is to be counted, timed or measured in duration.

19 Claims, 11 Drawing Figures

CHAR. 1 — MONITORING WIRE NUMBER — CHAR. 6

| | 542 | 543 | 544 | 545 | 546 | 547 | 548 | 549 | 550 | 551 | 552 | 553 | 554 | 555 | 556 | 557 | 558 | 559 | 560 | 561 | 562 | 563 | 564 | 565 |
|---|---|---|---|---|---|---|---|---|---|---|---|---|---|---|---|---|---|---|---|---|---|---|---|---|
| COUNTED EVENT=1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 |
| TIME & DURATION EVENT=1 | 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 | 0 |
| BEFORE VIP=1 | 0 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| AFTER VIP=1 | 0 | 0 | 0 | 0 | 0 | 1 | 1 | 1 | 0 | 0 | 0 | 0 | 0 | 0 | 0 | 0 | 0 | 0 | 0 | 0 | 0 | 0 | 0 | 0 |
| $L_1$ REF.=1 $L_2$ REF.=0 | 1 | 1 | 1 | 1 | 1 | 0 | 0 | 0 | 1 | 0 | 1 | 1 | 1 | 1 | 1 | 1 | 0 | 0 | 0 | 0 | 0 | 0 | 0 | 0 |
| SHORT DURATION=1 LONG DURATION=0 | 0 | 0 | 0 | 0 | 0 | 1 | 1 | 1 | 0 | 1 | 0 | 0 | 0 | 0 | 0 | 0 | 0 | 0 | 0 | 0 | 0 | 0 | 0 | 0 |
| NORMALLY ABSENT=1 NORMALLY PRESENT=0 | 0 | 1 | 1 | 1 | 1 | 0 | 0 | 0 | 1 | 0 | 1 | 1 | 1 | 0 | 0 | 1 | 1 | 1 | 0 | 1 | 0 | 0 | 0 | 0 |

CHAR. 37 — MASK MATRIX — CHAR. 42

PROGRAMMABLE VENDING MACHINE ACCOUNTABILITY APPARATUS

FIELD OF INVENTION

This invention relates to vending machine accountability apparatus and, more particularly, to apparatus for monitoring and recording cash transactions and the occurrence of other events within a vending machine.

BACKGROUND OF INVENTION

In recent years, vending machines have become increasingly complex. Now, a large variety of products at a variety of prices can be dispensed by a single vending machine. In addition to coins, banknotes and credit cards can be used to obtain credit for a purchase in some systems. As an aid in the management of such machines, vending machine accountability apparatus has been developed to monitor and record electronically cash transactions and other events occurring within the machine. However, many older machines do not have such apparatus, and, where such apparatus does exist, they are inflexible in that the particular transactions or events monitored within the vending machine are fixed. Thus, vending machine managers are prohibited from temporarily or permanently varying the information recorded by this apparatus.

SUMMARY OF THE INVENTION

The present invention is an accountability apparatus comprising a small box which can be installed on any flat, metal surface inside a vending machine. Extending from the box are a number of monitoring wires which can be attached to wires within the vending machine carrying AC signals selected for monitoring. The apparatus can be installed in the vending machine without rewiring or other significant physical modification of the vending machine. The box contains a microprocessor and associated memory devices which store both data monitored from the vending machine and programming data for the microprocessor. The particular programming data stored depends upon the particular AC signals selected for monitoring and the particular information sought from these signals.

The accountability apparatus can monitor cash transactions as reported by the coin mechanism along with the occurrence, time and duration of events related to product vending, vending machine operation or malfunctions, and the servicing of the vending machine by route personnel. The apparatus is programmed by a central computer at the time of installation into the vending machine and can be reprogrammed by the computer for installation into a different vending machine or for monitoring different AC signals within the same vending machine. Rewiring of the vending machine or apparatus is unnecessary to effect either of these changes. Interrogation of the accountability apparatus to obtain monitored data takes place without removal of the apparatus from the vending machine through an optical data transmission link.

DESCRIPTION OF THE DRAWINGS

The present invention will be understood more readily when considered together with the accompanying drawings, in which.

DETAILED DESCRIPTION OF EMBODIMENTS

Figure 1:
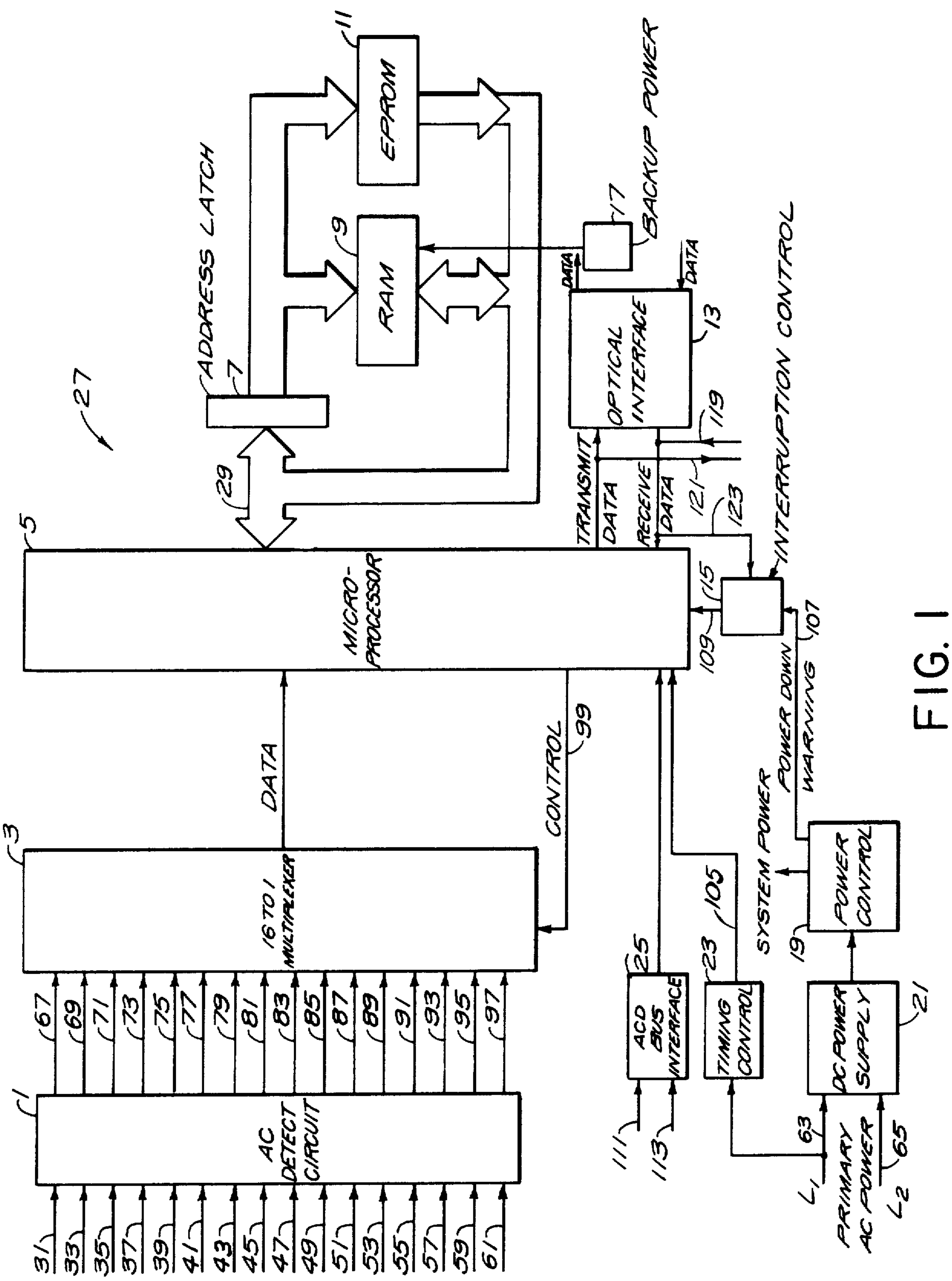
FIG. 1 is a schematic block diagram of a first embodiment of the invention.

A schematic block diagram of a programmable vending machine accountability apparatus 27 in accordance with the present invention is shown in FIG. 1.

All operations of accountability apparatus 27 are controlled by a single microprocessor 5. Non-volatile, random access memory (RAM) 9 and non-volatile, electrically programmable read-only memory (EPROM) 11 are connected to microprocessor 5 through address latch 7 and communicate with microprocessor 5 over bidirectional data bus 29. RAM 9 and EPROM 11 store both data for programming the microprocessor and data monitored from the vending machine. Programming data specific to the particular signals within the vending machine monitored, and data from these signals, are stored in RAM 9.

The sixteen AC monitoring wires 31, 33, 35, 37, 39, 41, 43, 45, 47, 49, 51, 53, 55, 57, 59 and 61 are attached to wires within the vending machine carrying AC signals selected for monitoring. These AC monitoring wires simply are clipped to the selected vending machine wires, using insulation piercing clips, type no. 53440, manufactured by AMP, Inc., without modification of the vending machine's wiring scheme. The AC monitoring wires 31–61 each are connected to one section of the AC detect circuit 1. One such section is illustrated in detail in FIG. 2. AC detect circuit 1 detects the presence of AC signals on the monitoring wires having an amplitude between 20 and 135 volts. Each section of detect circuit 1 produces a logic level output indicating the presence or absence of an AC signal on its associated monitoring wire. An output level of zero indicates an AC signal is present and an output level of five volts indicates the absence of an AC signal. Ground reference for detect circuit 1 is the midpoint of the primary AC input lines 63 and 65 ($L_1$ and $L_2$). This ground reference enables the AC detect circuit to react to the presence of AC signals of either $L_1$ or $L_2$ polarity.

The output of AC detect circuit 1 appears on output lines 67, 69, 71, 73, 75, 77, 79, 81, 83, 85, 87, 89, 91, 93, 95 and 97 which are connected to sixteen-to-one multiplexer 3 which is caused, by signals over control line 99 from the microprocessor, to scan these output lines continuously. Timing control circuit 23, illustrated in FIG. 3, produces a square wave signal from the $L_1$ primary input line 63 and supplies this signal to microprocessor 5 over line 105. This signal provides a phase and timing reference for the micropressor which enables the microprocessor to control multiplexer 3 such that all sixteen outputs of detect circuit 1 are scanned each half-cycle of the primary AC signal. This signal also enables the microprocessor to maintain the correct reference to the $L_1$ or $L_2$ positive half-cycle.

Figure 4:
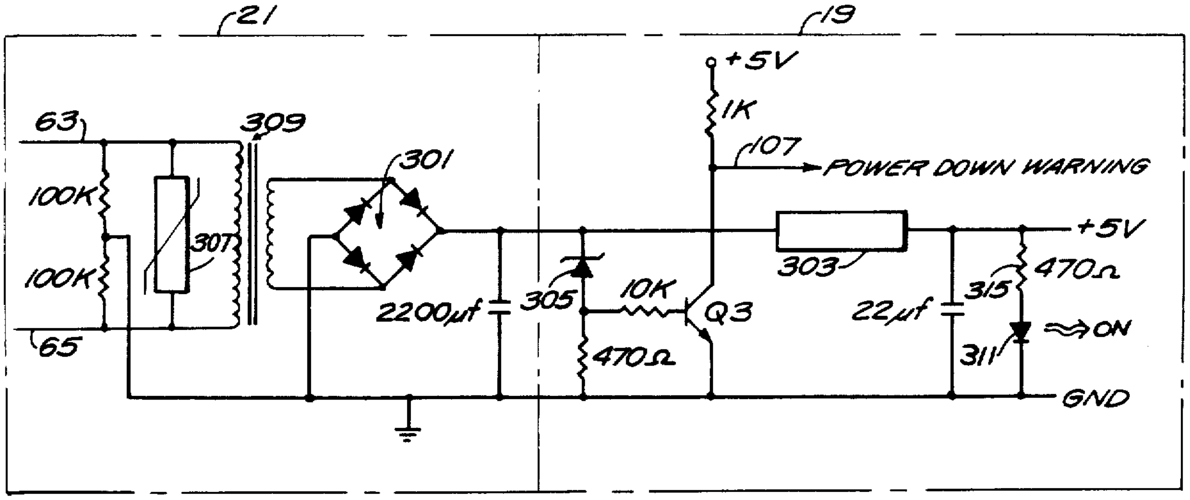
FIG. 4 is a schematic diagram of a DC power supply and a power control circuit for the embodiment of FIG. 1.

Primary AC input lines 63 and 65 provide 115 VAC to DC power supply 21, illustrated in FIG. 4, which operates in conjunction with power control circuit 19, also illustrated in FIG. 4, to generate a well-regulated +5 volt DC supply for normal operation of all logic circuits. Power control circuit 19 provides a signal on line 107 warning of the imminent loss of primary power. This warning signal is supplied to interruption control circuit 15, illustrated in FIG. 5, which supplies a signal to microprocessor 5 over line 109. Upon receipt of this signal from the interruption control circuit, microprocessor 5 completes data transfers to and from RAM 9 and ensures that all data files are secure. Backup power supply 17, which comprises a long-life, nonrechargeable lithium battery, automatically supplies backup power to RAM 9 until primary power is restored.

Figure 7:
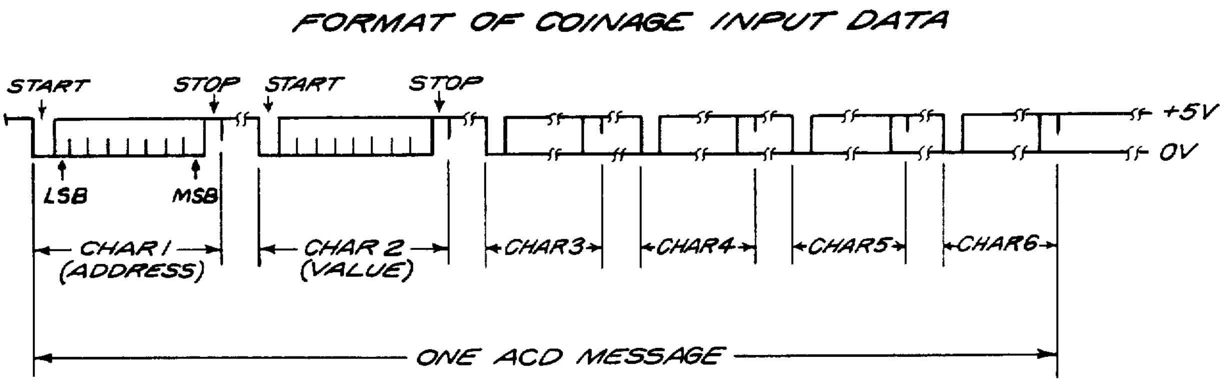
FIG. 7 illustrates the format of coinage input data for the embodiment of FIG. 1.

Cash transaction data is obtained over a two-wire serial data link (referred to as the accountability display bus or ACD bus) built into coinage mechanisms recently manufactured by Mars Money Systems, Inc., of Folcroft, Pa., such as model nos. 800 and 900. Wires 111 and 113 are connected to this bus and to interface circuit 25 which accepts this data. The data, illustrated in FIG. 7, are monitored for both the total cash value of each vend and the value of each coin directed to the cashbox.

Accountability apparatus 27 receives programming data and is interrogated for monitored data through two-way LED optical interface 13 or directly, bypassing the optical interface, over wire 119. Output data from accountability apparatus 27 can pass either directly over wire 121 or through LED optical interface 13. Line 123 activates interruption control circuit 15 causing microprocessor 5 to cease scanning the AC detect circuit until interrogation or the transmission of programming data is complete.

Figure 2:
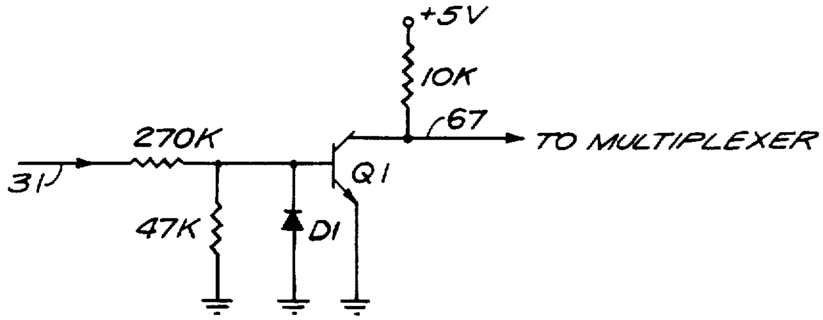
FIG. 2 is a schematic diagram of a section of an AC detection circuit for the embodiment of FIG. 1.

FIG. 2 illustrates one section AC detect circuit 1. The section illustrated is that which operates in conjunction with AC monitoring wire 31 and output wire 67. AC detect circuit 1 contains sixteen such circuits, identical to that illustrated in FIG. 2, for detecting AC signals on the sixteen AC monitoring wires of accountability apparatus 27. As shown in FIG. 2, monitoring wire 31 is in series with a 270K resistor. The output of this resistor is shunted to ground through a 47K resistor and connected to the base of transistor Q1. The emitter of transistor Q1 is grounded and the collector is connected to the +5 volt DC power supply through a 10K resistor. Diode D1 protects the emitter-base junction of the transistor during the negative half-cycle of AC signals appearing on monitoring wire 31. In the absence of an AC signal on the monitoring wire, transistor Q1 is in the non-conducting state and output line 67 is at +5 volts. The appearance of an AC signal on monitoring wire 31 saturates transistor Q1 and drives the voltage of output line 67 to ground. Ground reference is the midpoint of the $L_1$ and $L_2$ primary AC input lines. Thus, the input data to multiplexer 3 on line 67 and the other lines of AC detect circuit 1 is a series of logic level pulses indicating the presence or absence of an AC signal. AC detect circuit 1 will respond with logic level outputs to AC signals having an amplitude of between 20 and 135 volts.

Figure 3:
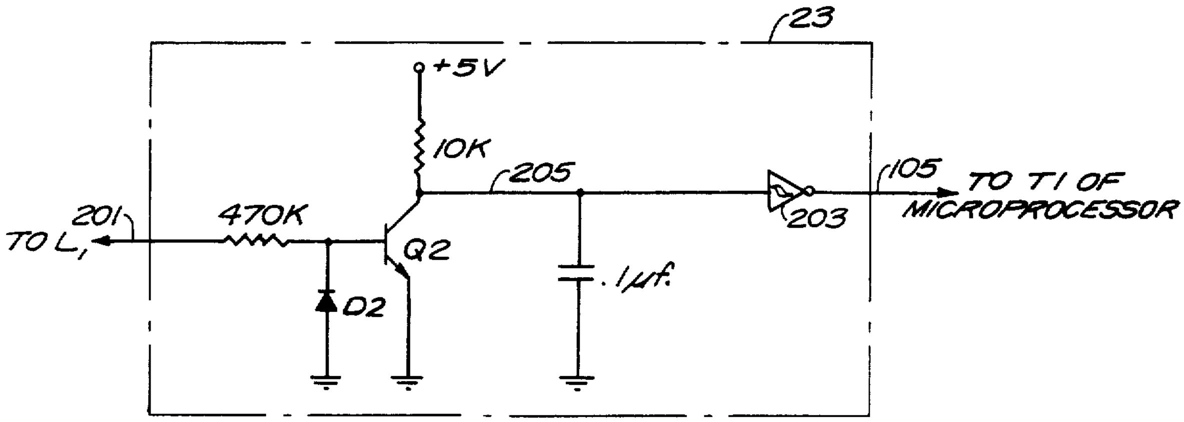
FIG. 3 is a schematic diagram of a clock circuit for the embodiment of FIG. 1.

FIG. 3 is a schematic diagram of timing control circuit 23. Line 201, which is connected to the $L_1$ primary AC input line, is connected to the base of transistor Q2 through a 470K resistor. The AC signal on line 201 causes transistor Q2 to alternate between the saturated and non-conducting states and produce a square-wave signal on line 205. Diode D2 protects the emitter-base junction of the transistor during the negative half-cycle of the AC signal. The square-wave signal is shaped by a 0.1 uf capacitor and Schmitt trigger 203 and passes on line 105 to the T1 pin of the microprocessor. This signal provides universal timing for all microprocessor operations and enables microprocessor 5 to control multiplexer 3 such that all sixteen AC monitoring wires are scanned for input data every 8.3 MS which is one half-cycle of the primary AC input signal.

FIG. 4 is a schematic diagram of DC power supply circuit 21 and power control circuit 19. The power supply circuit receives primary AC input over wires 63 and 65 which are isolated from each other by transient suppression device 307 and two 100K resistors. DC ground is referenced between these two 100K resistors. The primary AC voltage is reduced by transformer 309 and rectified by full-wave bridge rectifier 301. A 22 uf filter capacitor and regulator 303 produce a +5 volt DC output. LED 311 in series with 470 ohm resistor 315 provides a "power on" indication. The large 2200 uf capacitor assures that power supply 21 will provide DC power for a sufficient time after an AC power outage for microprocessor 5 to complete the tasks necessary to prevent the loss of data. The zener diode 305 permits current to flow through the 10K resistor putting a positive voltage on the emitter-base junction of transistor Q3. This voltage causes current to flow through the 1K resistor connected to the collector of this transistor. An AC power outage is detected by zener diode 305 which stops conducting immediately upon such an occurrence causing transistor Q3 to become inactive. A signal of +5 volts appears on line 107 which is connected to the interruption control circuit 15. This circuit signals microprocessor 5 to secure data and prepare for the loss of primary power.

Figure 5:
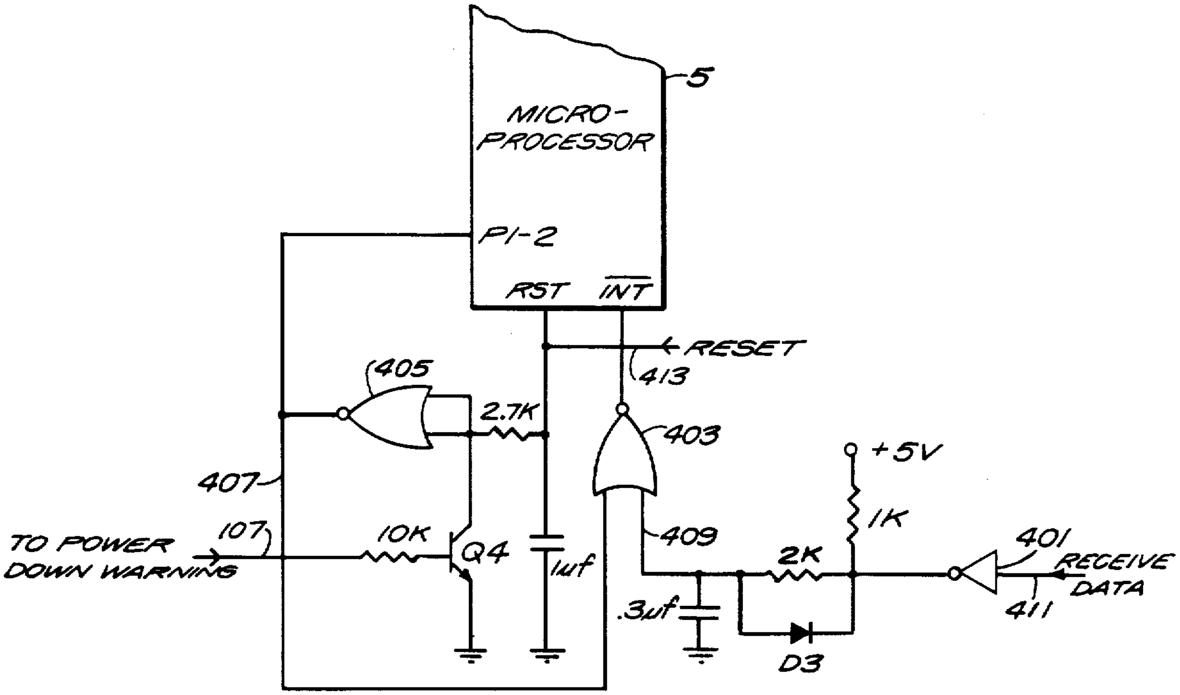
FIG. 5 is a schematic diagram of an interruption control circuit for the embodiment of FIG. 1.

FIG. 5 is a schematic diagram of interruption control circuit 15. The signal on power-down warning line 107 goes to +5 V immediately after the interruption of primary AC power. This signal saturates transistor Q4 grounding both inputs of NOR gate 405 whose output on line 407 goes to +5 V. This output is applied to the P1-2 pin of microprocessor 5 and to one input of NOR gate 403. If programming or interrogation data is not being received by microprocessor 5, the second input of NOR gate 403 on line 409 is at ground, and, therefore, the +5 V signal on line 407 causes the output of NOR gate 403 to go to ground. This output from NOR gate 403 goes to the interrupt (INT) pin of microprocessor 5 causing the microprocessor to terminate scanning the outputs of AC detect circuits 1 and to prepare for the cessation of primary AC power.

The initial receipt of incoming programming or interrogation data on wire 411 causes the signal on this wire to go to ground. Inverter 401 inverts this signal and applies it, across diode D3 in parallel with a 2K resistor, to one input of NOR gate 403 on line 409 causing the output of this NOR gate to go to ground. This output from the NOR gate causes microprocessor 5 to interrupt the scanning of AC monitoring wires and to receive programming or interrogation instructions.

The resumption of primary AC power causes transistor Q4 to return to the non-conducting state and +5 V to appear at the reset (RST) pin of the microprocessor. If no data is incoming on line 411, the microprocessor causes multiplexer 3 to resume scanning the outputs of AC detect circuits 1. A signal on reset line 413 causes the resumption of scanning following receipt and servicing of programminng and interrogation instructions.

Accountability apparatus 27 is specifically programmed by a central computer for the particular vending machine into which it is to be installed and for the particular AC signals within the vending machine selected for monitoring. This programming of the accountability apparatus is accomplished by storing a series of sixteen bytes (eight bits each) of programming data in RAM 9. These sixteen bytes of programming data, referred to as "mask bytes," guide microprocessor 5 in the interpretation and processing of data as it appears on the sixteen AC monitoring wires. A serial number and a security code, each comprising six hexadecimal characters, also are stored in RAM 9. The serial number is part of all messages from the accountability apparatus to identify the source of the data. The security code precedes each interrogation request. Microprocessor 5 compares the transmitted security code with the code stored in RAM 9 and, if the two codes match, the interrogation protocol is allowed to proceed. If the codes do not match, microprocessor 5 will refuse all interrogation requests for a one minute period. This refusal renders impractical any efforts to determine the security code by a series of messages containing all possible security codes.

Accountability apparatus 27 can be programmed (1) to count events associated with the delivery of products in return for deposited cash ("vend events"), (2) to count events not timed with product delivery such as compressor actuations ("counted events"), (3) to record the time and date on which an event occurs such as the time and date on which cups are sold-out ("timed events"), and (4) to record both the time and date on which an event occurs and the duration of the event such as the time, date and duration of a door opening ("time and duration events"). In addition, when accountability apparatus 27 is installed in vending machines containing coinage mechanisms recently manufactured by Mars Money Systems, Inc., the accountability apparatus can be programmed to record both the total cash value of each vend and the value of each coin directed to the cash box. A maximum of sixteen AC signals (not including cash transaction signals on the ACD bus) can be monitored for events in any of the four categories listed above.

Figure 6:
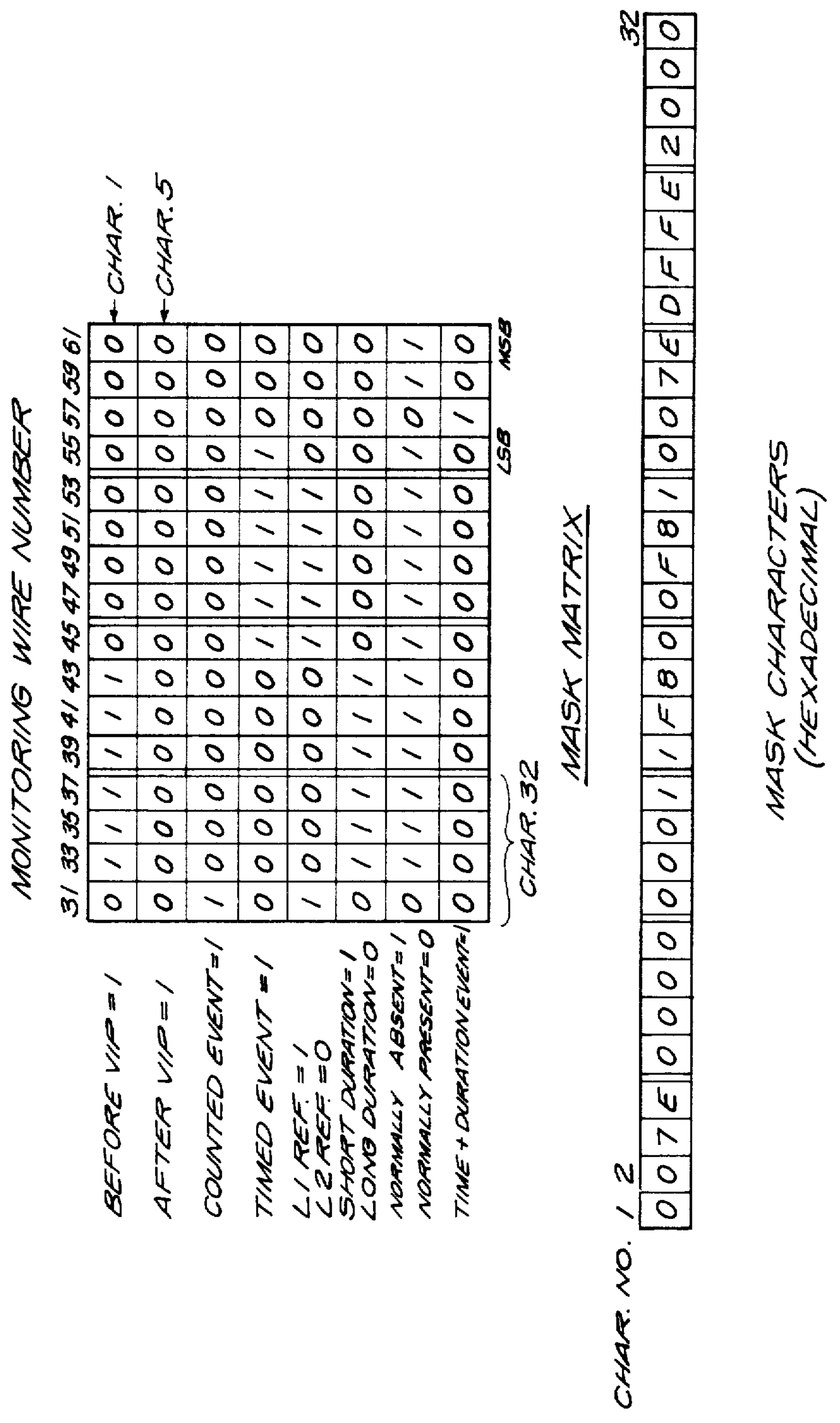
FIG. 6 illustrates a matrix of masking data for the embodiment of FIG. 1.

The mask bytes program the microprocessor for the particular characteristics of each AC signal selected for monitoring and for the particular data sought from each signal. The upper table in FIG. 6 illustrates a matrix of masking data in which each column represents a mask byte for interpreting the data appearing on one AC monitoring wire. Each mask byte answers the following eight questions regarding the data appearing on the monitoring wire:

(1) If the signal monitored is a vend event, does the signal occur before the vend-in-progress signal ("VIP" signal) from the vending machine? A "1" means yes and a "0" means no.

(2) If the signal monitored is a vend event, does the signal occur after the VIP signal? A "1" means yes and a "0" means no.

(3) Is the monitoring wire monitoring a counted event? A"1" means yes and a "0" means no.

(4) Is the monitoring wire monitoring a timed event? A "1" means yes and a "0" means no.

(5) Is the monitored signal referenced to the $L_1$ or $L_2$ positive half-cycle of the primary AC signal? A "1" means the reference is to $L_1$ and a "0" means the reference is to $L_2$.

(6) Does the monitored signal have a short duration (less than 48 MS) or a long duration (greater than 48 MS)? A "1" means the duration is short and a "0" means the duration is long.

(7) Is the monitored signal normally present or normally absent? A "1" means the signal is normally absent and a "0" means the signal is normally present.

(8) Is the monitoring wire monitoring a time and duration event? A "1" means yes and a "0" means no.

If any of the AC signals monitored are vend events, then the first monitoring wire (monitoring wire 31 in FIG. 6) must be connected to the VIP signal from the vending machine. This signal is always an open circuit when a vend occurs. Both VIP bits are "0" and the counted event bit is "1" for the byte defining the signal on this monitoring wire. AC signals monitored for vend events must be assigned to consecutive monitoring wires beginning with the second monitoring wire. Either the "before VIP" or the "after VIP" bits must be "1" for the bytes defining the signals on these wires (monitoring wires 33, 35, 37, 39, 41 and 43 in FIG. 6). AC signals monitored for counted events must be assigned to consecutive monitoring wires beginning with the first wire immediately following the last wire monitoring a vend event. No wire in FIG. 6 is monitoring a counted event. AC signals monitored for timed events must be assigned to consecutive monitoring wires beginning with the first wire immediately following the last wire monitoring a counted event. Monitoring wires 45, 47, 49, 51, 53, and 55 in FIG. 6 are assigned to monitor timed events. AC signals monitored for time and duration events must be assigned to consecutive monitoring wires beginning with the first wire immediately following the last wire monitoring an event in the first three categories. Monitoring wire 57 in FIG. 6 is assigned to monitor a time and duration event. If the first, second, third, fourth and eighth bits of the mask byte defining the signal on a monitoring wire are all "0", i.e., if the monitored event is neither in the vend, counted, timed nor time and duration categories, then the wire is unused (monitoring wires 59 and 61 in FIG. 6). Unused wires must follow all used wires. More than one monitoring wire can be assigned to the same signal if, for example, the event defined by that signal is to be both timed and counted.

The matrix of masking data is arranged as a linear series of thirty-two hexadecimal characters as illustrated in the lower table in FIG. 6. Each character represents four consecutive bits of the mask matrix proceeding from right to left across each row, beginning with the top row and proceeding continuously through the bottom row. This linear format is used to program the masking data serially into RAM 9 of accountability apparatus 27.

Multiplexer 3 scans all outputs of AC detect circuit 1 once during each half-cycle of the primary AC signal. During each half-cycle scan, microprocessor 5 refers to the $L_1$ and $L_2$ bits of each mask byte to select data for processing only from signals referenced to that half-cycle. The absent/present bits are used to select data for processing only from those input signals in an "activated" state (the state opposite their normal state). After each full cycle of the primary AC signal, microprocessor 5 generates a "sample word" of two bytes (sixteen bits) in which each "1" indicates detection of a signal activated during the half-cycle to which the signal is referenced. For each "1", the microprocessor refers to the long/short bit of the mask byte defining that signal. If this bit is "0" (long duration), the sample word is registered in a "long stack," and if this bit is "1" (short duration), the sample word is registered in a "short stack."

The long stack is used to detect AC events lasting longer than three cycles of the primary AC signal (48 MS). This stack contains three successive sample words. If the same bit is "1" in all three samples, a "1" is set in a bit of a long "status word" indicating detection of the event represented by that bit. Similarly, three successive samples in which this bit is "0" causes a "0" to be set in this bit of the status word indicating the failure to detect this monitored event.

The short stack is used to detect AC events lasting less than three cycles of the primary AC signal. This stack contains the current sample word and also, if there is a change in any bit of the current sample word, the previous sample word. If a bit of the current sample is "1" and the same bit in the previous sample is "0", a "status flag" for that bit is set indicating detection of the event represented by that bit. The status flag is reset when this bit in the current sample is "0" and the same bit of the previous sample is "1".

After confirmation of a monitored event, microprocessor 5 interrogates the active signal's mask byte to determine the type of event, i.e., whether vend, counted, timed or time and duration, and, if a vend event, its relationship to the VIP signal. If the event is in the vend or counted categories, microprocessor 5 increments a counter for that event and the new count is stored in RAM 9. If the event is timed, the microprocessor stores the time on which the event occurs in the data file in RAM 9 for that event. The microprocessor is programmed to keep elapsed time continuously. If the event is of the time and duration category, the microprocessor stores both the time and date of the event and its duration in RAM 9. Duration is determined using a timer, internal to the microprocessor, which is activated and deactivated at the initiation and termination of the event, respectively.

FIG. 7 illustrates the format of input data on the ACD bus from the coinage mechanism. Each message contains six characters transmitted at 1200 baud in an asynchronous manner. Each character comprises a start bit, eight data bits and a stop bit. The characters are grouped into three identical pairs with each pair comprising an address character for identification of the message, followed by a value character. The pair is transmitted three times to allow redundancy checking which avoids data errors resulting from noise. The signal on the ACD bus is normally at +5 V (logical "1") and falls to 0 volts for the start bit. The stop bit for each character remains at +5 V for at least one bit period. Addresses 01 and 03 indicate coin-to-cashbox and vended-cash messages, respectively. Microprocessor 5 ignores all other messages appearing on the ACD bus. The value character has a range of between 1 and 255 with each unit representing five cents.

Figure 8:
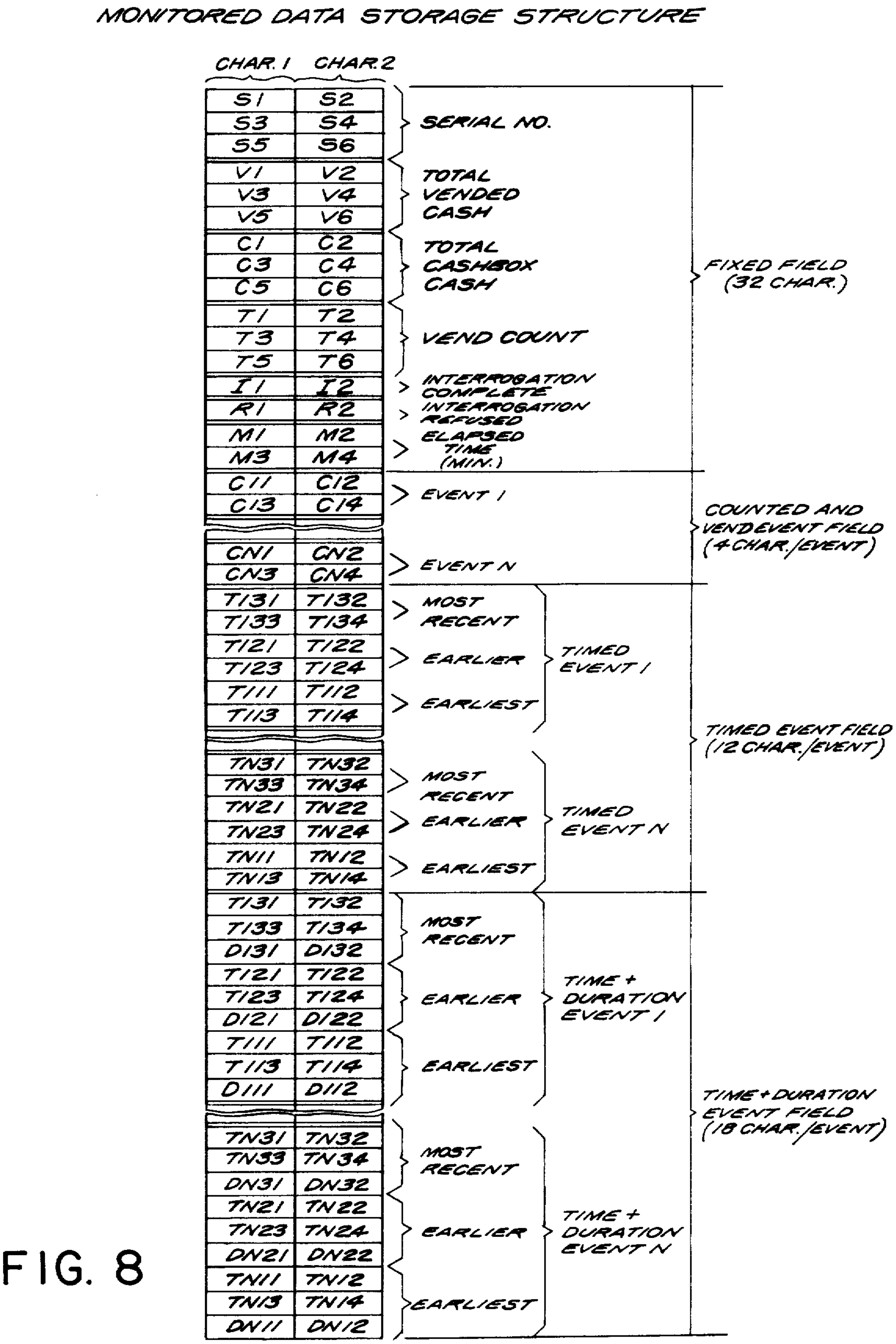
FIG. 8 illustrates the data storage structure for the embodiment of FIG. 1.

The storage of monitored data in RAM 9 is organized into four storage fields as illustrated in FIG. 8. These fields are: (1) the fixed field; (2) the counted and vend event field; (3) the timed event field; and (4) the time and duration event field. The data files in each field are updated continuously as monitoring of vending machine operations proceeds.

If accountability device 27 monitors an ACD bus, the fixed-field storage configuration comprises thirty-two hexadecimal characters. If accountability device 27 does not monitor an ACD bus, the twelve characters allocated to storage of this data are not updated. The fixed field is organized and defined as the following table indicates.

| Parameter | Length | Units | Range |
|---|---|---|---|
| Serial Number | 6 char. | N/A | 000000 to 999999 |
| Vended Cash | 6 char. | 5 cents | 0 to $838,860.75 |
| Cashbox Cash | 6 char. | 5 cents | 0 to $838,860.75 |
| Vend Count | 6 char. | 1 cnt. | 0 to 65,535 |
| INT. Complete | 2 char. | 1 cnt. | 0 to 255 |
| INT. Refused | 2 char. | 1 cnt. | 0 to 255 |
| Elapsed Time | 4 char. | 6 min. | 0 to 273 days |

The serial number file stores an arbitrary number selected to identify the accountability apparatus. The elapsed time file indicates the state of a counter, internal to the microprocessor, which increments as long as primary power is applied to the apparatus. The state of this counter is used to measure elapsed time on a continuous basis. The remaining files in the fixed field accumulate data continuously beginning with the time of initiation of monitoring of the vending machine by the accountability apparatus. The vended cash file, containing data obtained from the ACD bus, indicates the total cash value of all product vends. The cashbox cash file, whose data also are obtained from the ACD bus, indicates the total value of all coins directed to the cashbox. The vend count file indicates the total number of vends of all products from the vending machine. The interrogation complete and interrogation refused files indicate the total number of successful and the total number of unsuccessful interrogations of the accountability apparatus, respectively.

The remaining data fields in RAM 9 are of variable length depending upon the number of vend, counted, timed, and time and duration events for which the accountability apparatus is programmed to monitor. Four characters are allocated to each monitored event in the counted and vend event field enabling storage of up to 65,535 counts. This field accumulates data continuously beginning with the time of initiation of monitoring of the vending machine by the accountability device.

The characters allocated to each monitored event in both the timed and the time and duration fields are organized into three groups containing data for the most recent three occurrences of the event monitored. Four characters are allocated to each group in the timed event field enabling recordation of the elapsed time (to the nearest six minutes) of an occurrence. The time and duration event field has an allocation of six characters per group with four characters allocated to the time of the event and two allocated to its duration. The information recorded as to the time of the event is identical to that in the timed event field. The duration characters record duration to the nearest six minutes and have a range of up to twenty-five days. Events lasting less than one minute are not recorded.

The embodiment of the present invention illustrated in FIG. 1 was designed with the following components:

| | |
|---|---|
| Microprocessor 5: | Part No. 8748 manufactured by Intel. |
| Address Latch 7: | Part No. 74C373 manufactured by National Semiconductor. |
| RAM 9: | Part No. 5101L manufactured by Intel (storage capacity 128 × 8). |
| EPROM 11: | Part No. 2758 manufactured by Intel. |
| Multiplexer 3: | Part No. 74C150 manufactured by National Semiconductor. |

Figure 9:
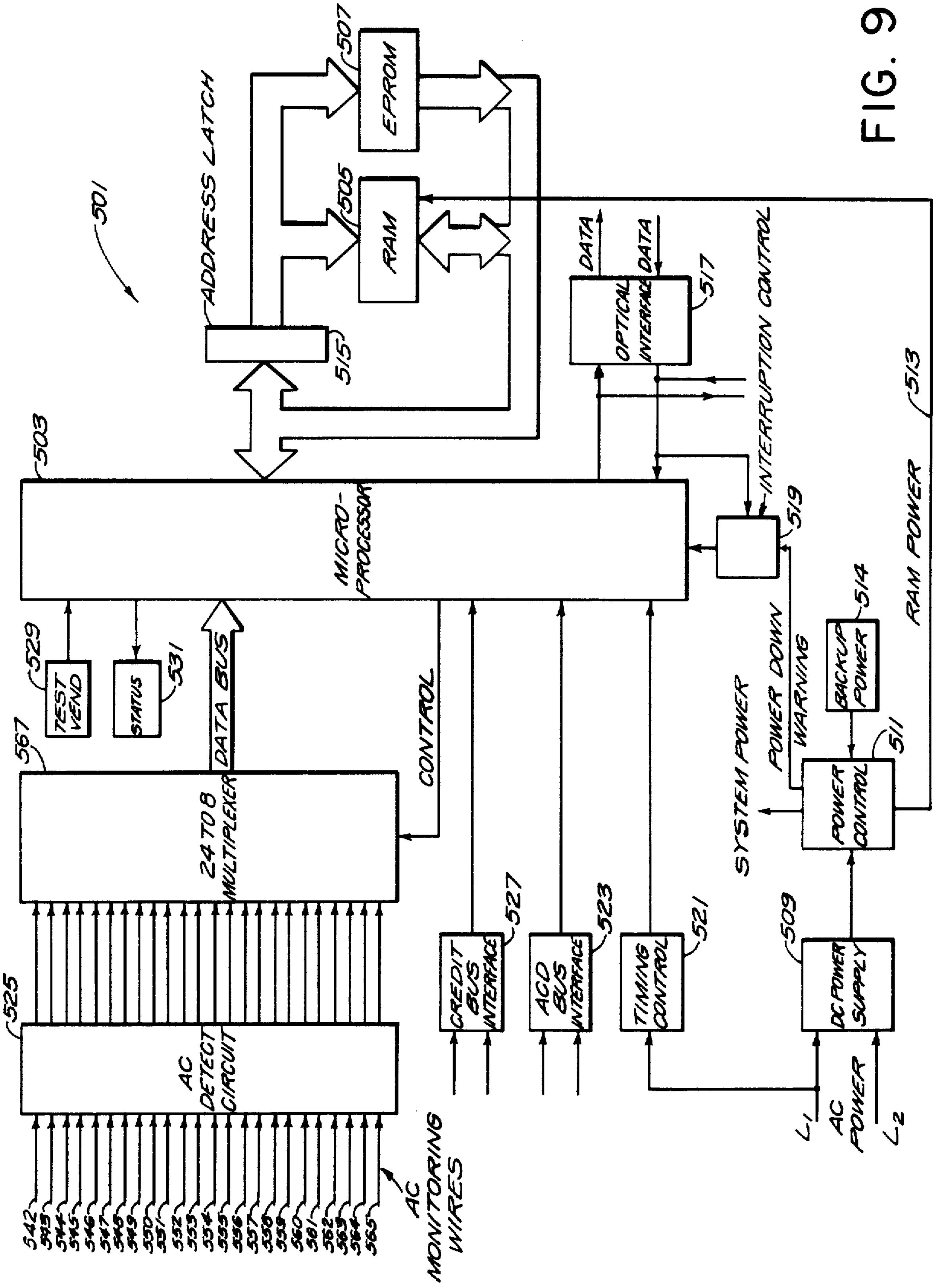
FIG. 9 is a schematic block diagram of a second embodiment of the invention.

A schematic block diagram of a second embodiment of a programmable accountability apparatus in accordance with the present invention is shown in FIG. 9. Accountability apparatus 501 is controlled by microprocessor 503. RAM 505 and EPROM 507 store programming and monitoring data and work in conjunction with microprocessor 503 through address latch 515 in a manner similar to RAM 9 and EPROM 11 of accountability apparatus 27. Primary AC input lines $L_1$ and $L_2$ provide 115 VAC to DC power supply 509 which operates with power control circuit 511 to generate a system power supply of +5 V. Power line 513 from power control circuit 511 provides power to RAM 505. Backup power supply 514, comprising a long-life lithium battery, is connected to power control circuit 511 and keeps power line 513 to RAM 505 active even if primary AC power is lost. Optical interface circuits 517, interruption control circuit 519, timing control circuit 521 and ACD bus interface circuit 523 perform substantially the same functions as optical interface circuit 13, interruption control circuit 15, timing control circuit 23 and ACD bus interface circuit 25 of accountability device 27.

AC detect circuit 525 comprises twenty-four AC monitoring wires 542–565 for attachment to selected AC monitoring points within the vending machine and twenty-four output wires which are connected to multiplexer 567. Each AC monitoring wire is connected to a section of the AC detect circuit, substantially similar to the section illustrated in FIG. 2 for accountability apparatus 27, which produces a logic level output (OV or +5 V) indicating the presence or absence of an AC signal.

Accountability apparatus 501 also contains credit bus interface circuit 527, test vend switch 529 and status indicator 531. Credit bus interface circuit 527 is connected to the credit bus (also referred to as the cash counter) of coinage mechanisms not containing an ACD bus. The signal on the credit bus is used to determine the total cash value of each completed vend. Test vend switch 529 enables route personnel to test vend a machine after product loading or maintenance without updating data files. Each activation of this switch causes microprocessor 503 to enter a test-vend mode for one minute. During this period, the microprocessor updates a counter to reflect the total number of test vends performed. Status indicator 531 comprises an LED which glows steadily while accountability apparatus 501 is operating and which flashes when microprocessor 503 is in the test-vend mode. Microprocessor 503 updates a counter to reflect the total number of free vends, i.e., vends which occur when the microprocessor is neither in the test vend mode nor in receipt of a corresponding signal from the coinage mechanism via ACD bus interface 523 or credit bus interface 527.

Figures 10, 11:
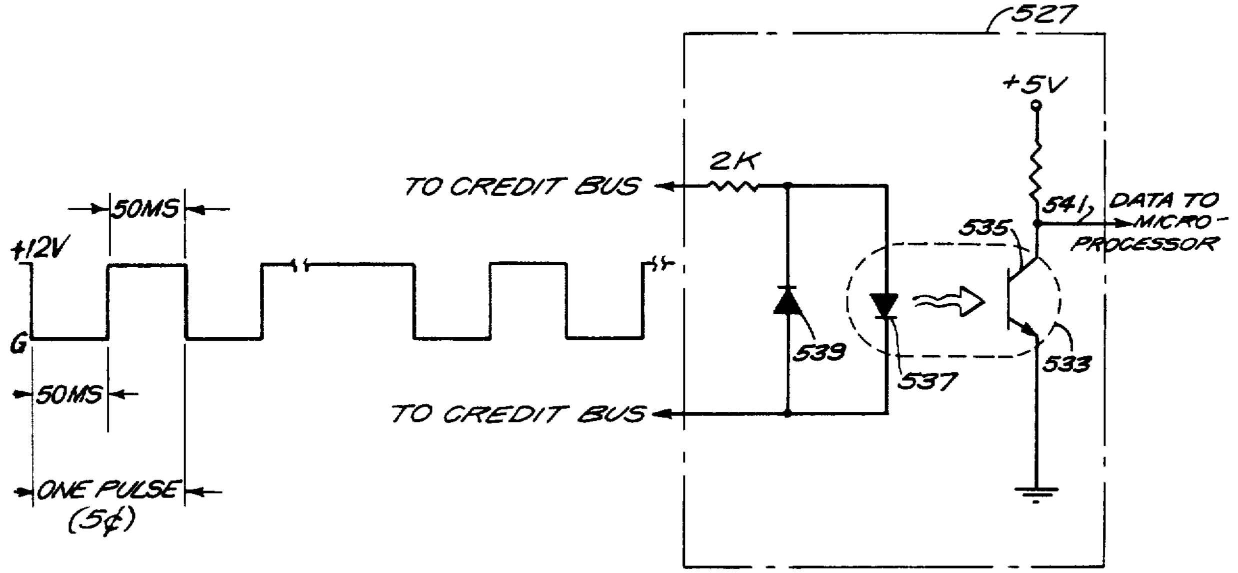
FIG. 10 is a schematic diagram of a credit bus interface circuit and an illustration of the signal received by this circuit for the embodiment of FIG. 9.
FIG. 11 illustrates a matrix of masking data for the embodiment of FIG. 9.

FIG. 10 is a schematic of credit bus interface circuit 527 and the signal appearing on the credit bus. This signal consists of a series of pulses having an amplitude of 12 V and a duration of 50MS. Each pulse corresponds to five cents. The total number of pulses multiplied by five cents is the total cash value of a completed vend.

Credit bus interface 527 comprises a 2K resistor in series with optical coupler 533. Diode 539 protects LED section 537 of optical coupler 533 from negative swings of the signal on the credit bus. During the +12 V positive half-cycle of the credit bus signal, current flows through LED section 537 of optical coupler 533, phototransistor section 535 of the coupler is in the conducting state, and the voltage on data line 541 goes to ground. When the signal on the credit bus is at ground, no current flows through LED section 537, phototransistor section 535 is in the non-conducting state and the voltage on data line 541 goes to +5 V. The resulting signal on data line 541, which is connected to microprocessor 503, is a series of pulses, alternating between +5 V and ground, each representing five cents in value.

The mask matrix for programming accountability apparatus 501, illustrated in FIG. 11, is a modification of the matrix used for programming accountability apparatus 27. The mask word defining the signal appearing on each monitoring wire contains seven bits rather than eight because there is no timed event category. For all timed events, a determination of duration also is made which results in all timed events being time and duration events. The meaning of each bit of the mask words for accountability apparatus 501 is the same as for corresponding bits of the mask bytes for accountability apparatus 27, except that the counted event bit is "1" for all wires monitoring both counted events and vend events. As with accountability apparatus 27, if any of the events monitored are vend events, the first monitoring wire (monitoring wire 542 in FIG. 11) must be connected to the VIP signal from the vending machine, and both VIP bits must be "0" for the word defining the signal on this monitoring wire. AC signals monitored for vend events must be assigned to consecutive monitoring wires beginning with the second monitoring wire, and one of the VIP bits must be "1" for the words defining the signals on these wires (monitoring wires 543, 544, 545, 546, 547, 548 and 549 in FIG. 11). AC signals monitored for counted events must be assigned to consecutive monitoring wires beginning with the first wire immediately following the last wire monitoring a vend event. Both VIP bits are "0" for these wires (monitoring wires 550, 551 and 552 in FIG. 11). AC signals monitored for time and duration events must be assigned to consecutive monitoring wires beginning with the first wire immediately following the last wire monitoring a counted event. Monitoring wires 553, 554, 555, 556, 557, 558, 559, 560 and 561 in FIG. 11 are assigned to monitor time and duration events. Unused wires (monitoring wires 562, 563, 564 and 565 in FIG. 11) must follow the last wire monitoring a time and duration event. Both the counted-event and the time-and-duration-event bits are "0" for unused wires.

The matrix of masking data for accountability apparatus 501 is arranged as a series of forty-two hexadecimal characters with each character representing four consecutive bits of the mask matrix proceeding from left to right across each row beginning with the top row and proceeding continuously through the bottom row. This string of characters is programmed serially into RAM 505 of accountability apparatus 501.

The format for storage of monitored data in RAM 505 of accountability apparatus 501 is identical to that illustrated in FIG. 8 for RAM 9 of accountability apparatus 27 with the following exceptions: (1) The fixed field contains forty characters rather than thirty-two. The additional eight characters are assigned equally to files for recording the total number of test vends and files for recording the total number of free vends. The range for both files is 0 to 65,535 counts. (2) Since no events are merely timed (a determination of duration also is made), there are only two fields of variable length, the counted and vend event field and the time and duration event field.

The embodiment of the present invention illustrated in FIG. 9 was constructed with the following components:

| | |
|---|---|
| Microprocessor 503: | Part No. 8035 manufactured by Intel. |
| Address Latch 515: | Part No. 74L5373 manufactured by National Semiconductor. |
| RAM 505: | Constructed using two identical 256 × 4 CMOS RAM's. Each is Part No. HM-6561 manufactured by Harris Semiconductor. |
| EPROM 507: | Part No. 2716 manufactured by Intel. (Storage capacity 2K × 8.) |
| Multiplexer 567: | Constructed using three identical multiplexer units. Each is Part No. 74C244 manufactured by National Semiconductor. |

A printout of the permanent programming which is entered into EPROM 507 to control microprocessor 503 for operation within accountability apparatus 501 follows:

```
LOC   OBJ          LINE        SOURCE STATEMENT

                         ;              ********************
                         ;            ****************************
                         ;        ******                    ******
                         ;     ******        DATA BOX II         ******
                         ;        ******                    ******
                         ;            ****************************
                         ;              ********************
                         ;


                         ;        THIS PROGRAM WILL CONTROL THE UNIVERSAL
                         ;        ACCOUNTABILITY COLLECTION UNIT PRODUCED BY
                         ;        MARS MONEY SYSTEMS.
                         ;
                         ;        THIS UNIT WILL SUPPORT 24 A.C. INPUTS.
                         ;        ONE SERIAL "A.C.D." BUS. ONE CASH COUNTER. &
                         ;        A BI-DIRECTIONAL DATA LINK TO A DATA COLLEC-
                         ;        TION DEVICE.


                         $EJECT

                         ;SYSTEM EQUATES

                         ; PORT ASSIGNMENTS
0001                     ACDBUS   EQU    01H     ;A.C.D. BUS DATA LINE   P1-0
0002                     OPLED    EQU    02H     ;OPERATE L.E.D. OUPUT   P1-1
0004                     TSTSW    EQU    04H     ;TEST VEND SWTCH INPUT  P1-2
0010                     LNKREC   EQU    10H     ;LINK RECIEVE DATA LNE  P1-4

0010                     LNKXMT   EQU    10H     ;LINK TRANSMIT DATA     P2-4
0020                     ACDINH   EQU    20H     ;A.C.D. BUS INT. INH.   P2-5
0040                     LNKINH   EQU    40H     ;LINK INT. INH.         P2-6
0080                     XRAMCS   EQU    80H     ;CHIP SELECT XRam       P2-7

                         ;INTERNAL RAM ALLOWCATIONS

0020                              ORG    20H
0020                     ACBUF1:  DS     3       ;A.C. INPUT BUFFER
0023                     ACBUF2:  DS     3       ;"  "     "     "
0026                     ACBUF3:  DS     3       ;
0029                     ACINP1:  DS     12      ;A.C. INPUT REGISTERS
```

```
0035  ACSHRT: DS      3       ;A.C. SHORT TERM BUFFER
0038  ACPCNT: DS      3       ;A.C. (PREV CNTD. WITHIN L6)
003B  ACDBUF: DS      2       ;A.C.D. BUS DATA BUFFER
003D  ACDCNT: DS      1       ;A.C.D. BUS BIT COUNTER
003E  CCCNT:  DS      1       ;CASH CNTR DEBOUNCE COUNTER
003F  TVSCNT: DS      1       ;TEST VEND SWITCH DEBOUNCE COUNTER

0018          ORG     18H
0018  DATBUF: DS      38D     ;L.E.D. LINK DATA BUFFER
003F  COMSTA  EQU     3FH     ;COMMUNICATION STATUS

      ;INTERNAL REGISTER USAGE
      ;
      ;R0=                     R0'=    LINK
      ;R1=                     R1'=    DATA
      ;R2=                     R2'=   BUFFER
      ;R3=REC. LINK BYTE CNTR  R3'=   DURING
      ;R4=REC. LINK BYTE CNTR  R4'=    LINK
      ;R5=COMM. LINK CRC BCC   R5'=   RECEIVE
      ;R6=COMM. LINK CRC BCC   R6'=
      ;R7=                     R7'=TEMP. ACC. REG. DURING INT.

      ;COMSTA 0= NACK CNTR BIT 1
      ;       1= NACK CNTR BIT 2
      ;       2=
      ;       3=
      ;       4=STACK SENT
      ;       5=DATA 2 SENT
      ;       6=
      ;       7=

      $EJECT
      ;EXTERNAL RAM ALLOWCATIONS

0001          ORG     01H

0001  SECCOD: DS      3       ;SIX DIGIT SECURITY CODE
0004  SERNO:  DS      3       ;SIX   "   SERIAL NUMBER

0007  VNDCSH: DS      3       ;ACTUAL VENDED CASH TOTAL
000A  BOXCSH: DS      3       ;  "    CASH TO THE CASH BOX
000D  VNDCNT: DS      3       ;VEND COUNT INFERRED FROM ACD.
0010  INTCNT: DS      1       ;INTEROGATION COUNTER
0011  SLPCNT: DS      1       ;# OF TIMES ASLEEP
0012  ELPSTM: DS      2       ;ELAPSED TIME COUNTER
0014  TVCNT:  DS      2       ;TEST VEND COUNTER
0016  FVCNT:  DS      2       ;FREE VEND COUNTER

0018  RAM:    DS      198D    ;COUNTED & TIMED EVENT STORAGE

00DE  CNTED:  DS      1       ;# OF COUNTED EVENT LINES
00DF  TIMDUR: DS      1       ;# OF TIME/DURATION EVENT LINES

00E0  ONESEC: DS      1       ;ONE SECOND COUNTER (60*60 HZ)
00E1  SIXSEC: DS      1       ;SIX SECOND COUNTER (06*1SEC.)
00E2  ONEMIN: DS      1       ;ONE MINUTE COUNTER (10*6SEC.)
00E3  TENMIN: DS      1       ;TEN MINUTE COUNTER (100*6SEC.)
00E4  SIXMIN: DS      1       ;SIX MINUTE COUNTER (60*6SEC.)
00E5  SLPTIM: DS      1       ;SEC. CODE "SLEEP" COUNTER
00E6  TVTIM:  DS      1       ;TEST VEND MINUTE COUNTER

00E7  INSTA1: DS      3       ;COUNTED EVENTS
00EA  INSTA2: DS      3       ;TIME/DURATION EVENTS
00ED  INSTA3: DS      3       ;L6 PRIOR
```

```
00F0          INSTA4: DS      3           ;L6 WITHIN
00F3          INSTA5: DS      3           ;L1/L2
00F6          INSTA6: DS      3           ;SHORT/LONG
00F9          INSTA7: DS      3           ;N.O./N.C. CONTACTS
00FC          VALID:  DS      1           ;XRAM VALIDITY BYTE
00FD          ACDPM:  DS      2           ;ACD BUS PREV. MESS. TEMP. STORE
              ;CONSTANTS
005A          VALBYT  EQU     5AH         ;XRAM VALIDITY VALUE
0004          TIMER1  EQU     04D         ;400US TIMER OVERFLOW
0009          TIMER2  EQU     09D         ;800US  "      "
0014          STDCK   EQU     20D         ;STANDARD MESSAGE LENGTH
0005          ENQ     EQU     05H         ;
0081          SOH     EQU     81H         ;
0001          ACK     EQU     01H         ;
0006          SRT     EQU     06H         ;
0007          STCK    EQU     07H         ;
0002          NACK    EQU     02H         ;
0090          DLE     EQU     90H         ;
0080          LSTMES  EQU     80H         ;
              $EJECT
0000                  ORG     00H
0000 040D     RESET:  JMP     INIT        ;JUMP PAST INTERUPTS
0003                  ORG     03H
0003 D5       INTR:   SEL     RB1
0004 AF               MOV     R7,A        ;PUSH THE ACC.
0005 2400             JMP     INTRSV      ;GOTO INTERUPT SERVICE
0007                  ORG     07H
0007 D5       TINTR:  SEL     RB1
0008 AF               MOV     R7,A
0009 540A             CALL    LDFULL      ;START 800US
000B 0432             JMP     ACDREC      ;SERVICE THE ACD BUS
              ;INITIALIZE AFTER HARDWARE RESET
000D 9A1F     INIT:   ANL     P2,#(XRAMCS OR ACDINH OR LNKINH) NOT
000F B83F             MOV     R0,#3FH             ;CLEAR INTERNAL RAM
0011 27               CLR     A
0012 A0       LOOP1:  MOV     @R0,A
0013 E812             DJNZ    R0,LOOP1
              ;DO MULTIPLE A.C. INPUT READS TO SET UP
              ;THE START STATE.
0015 BC08             MOV     R4,#08H
0017 14CA     LOOP2:  CALL    NEGEDG
0019 D49E             CALL    FOURMS
001B B404             CALL    ACIN1A
001D B415             CALL    ACIN2
001F EC17             DJNZ    R4,LOOP2
0021 D445             CALL    UDPREV      ;SET THE LONG/PREV. ON REGISTERS
0023 B4AA             CALL    CLRSHT      ;CLEAR THE SHORT REGISTERS
0025 7463     INIT1:  CALL    VALCHK              ;CHECK XRAM VALIDITY
0027 962E             JNZ     CTST                ;OK TO CONTINUE ???
0029 8A60             ORL     P2,#ACDINH OR LNKINH
002B 05               EN      I
```

```
002C 8400                 JMP     EXEC

002E 7449        CTST:    CALL    TSTXRM    ;TEST & CLEAR XRAM
0030 0400                 JMP     RESET

                 $EJECT

                 ;ACD BUS RECEIVE ROUTINE, HERE ONLY VIA THE TIMER INTERUPT
                 ;USES ACDCNT TO DIRECT ITS ACTIVITIES:
                 ;  BIT 0-3= BIT COUNTER
                 ;  BIT 4  = BYTE POINTER
                 ;  BIT 6  = ACTIVE BIT--SET IN INTERUPT, RESET AT END OF
                 ;           ACDBUS RECEIVE (RSTBUF). USED BY END OF
                 ;           EXEC TO DECIDE TO REENABLE LINK INT OR NOT.
                 ;  BIT 7  = ERROR BIT, SET AT END OF 1ST BYTE REC. RESET
                 ;           BY EXT. INT. INDICATES ERROR IF DETECTED AT
                 ;           ACDREC MEANING THE 2ND BYTE DID NOT CAUSE
                 ;           AN EXT. INT. WITHIN THE 2.0MS TIMEOUT.

0032 0A          ACDREC:  IN      A,P2      ;GET P2 TO SAVE ITS STATUS
0033 431F                 ORL     A,#1FH    ;NON-OUTPUTS HIGH
0035 AE                   MOV     R6,A

0036 B83D                 MOV     R0,#ACDCNT
0038 F0                   MOV     A,@R0
0039 F25E                 JB7     ERREXT            ;NO 2ND BYTE ERROR
003B 530F                 ANL     A,#0FH    ;LOW NIB TEST FOR ZERO
003D 9647                 JNZ     RECBIT    ;IF NON-ZERO GO RECEIVE BIT
003F 09          STRTBT:  IN      A,P1
0040 125E                 JB0     ERREXT    ;START BIT TEST
0042 2309                 MOV     A,#09H    ;SET UP COUNT BYTE
0044 30                   XCHD    A,@R0
0045 2410                 JMP     RETNI

0047 F0          RECBIT:  MOV     A,@R0     ;GET COUNT BYTE AGAIN
0048 B93B                 MOV     R1,#ACDBUF        ;ACD BUS DATA BUFFER
004A 924D                 JB4     DECCNT    ;BIT4=1 THIS IS 1ST BYTE
004C 19                   INC     R1        ;ADDRESS 2ND BYTE

004D 07          DECCNT:  DEC     A         ;DECREMENT THE COUNT BYTE
004E A0                   MOV     @R0,A     ;SAVE IT
004F 530F                 ANL     A,#0FH    ;MASK OFF THE CONTROL BIT
0051 C65B                 JZ      STOPBT    ;IF ZERO GO TEST FOR STOP BIT

0053 09          NEWBIT:  IN      A,P1      ;GET THE NEW BIT
0054 5301                 ANL     A,#01H    ;MASK OFF GARBAGE
0056 41                   ORL     A,@R1     ;COMBINE WITH OTHER INFO
0057 77                   RR      A
0058 A1                   MOV     @R1,A     ;SAVE IT
0059 2410                 JMP     RETNI

005B 09          STOPBT:  IN      A,P1      ;STOP BIT TEST
005C 1260                 JB0     DCDACD    ;STOP BIT OK, DECODE THE MESSAGE
005E 0483        ERREXT:  JMP     RSTBUF

0060 F0          DCDACD:  MOV     A,@R0     ;GET THE COUNT BYTE
0061 92BF                 JB4     FSTEXT    ;THIS IS ONLY 1ST BYTE, EXIT

0063 9A7F                 ANL     P2,#XRAMCS NOT    ;SELECT XRAM
0065 B8FD                 MOV     R0,#ACDFM         ;PREV MESS. XRAM
0067 B93B                 MOV     R1,#ACDBUF        ;THIS MESS. IRAM
0069 80                   MOVX    A,@R0
006A D1                   XRL     A,@R1
006B 9675                 JNZ     SAVNEW    ;IF NOT EQUAL SAVE NEW IN XRAM
006D 18                   INC     R0
006E 19                   INC     R1
006F 80                   MOVX    A,@R0             ;SECOND BYTE
0070 D1                   XRL     A,@R1
```

```
0071 C67D            JZ     DCD1
0073 C8              DEC    R0
0074 C9              DEC    R1

0075 F1     SAVNEW:  MOV    A,@R1
0076 90              MOVX   @R0,A
0077 18              INC    R0
0078 19              INC    R1
0079 F1              MOV    A,@R1
007A 90              MOVX   @R0,A
007B 04B3            JMP    RSTBUF

007D B938   DCD1:    MOV    R1,#ACDBUF        ;ADDRESS 1ST BYTE
007F F1              MOV    A,@R1
0080 07              DEC    A
0081 C6A7            JZ     CSHBOX
0083 07              DEC    A
0084 07              DEC    A
0085 96AD            JNZ    RSTXBF   ;THIS MESSAGE NOT FOR ME, EXIT

0087 B8E6            MOV    R0,#TVTIM         ;IF TEST VEND ACTIVE
0089 80              MOVX   A,@R0             ;DO NOT COUNT THE CASH
008A 96B3            JNZ    RSTBUF            ;COUNTER INPUT

008C B817   CSHVND:  MOV    R0,#FVCNT +1      ;DEC THE FREE VEND CNTR
008E 80              MOVX   A,@R0
008F 9696            JNZ    DECLO
0091 C8              DEC    R0                ;HIGH BYTE ADDRESS
0092 80              MOVX   A,@R0
0093 07              DEC    A
0094 90              MOVX   @R0,A             ;HIGH BYTE -1 STORED
0095 18              INC    R0                ;LOW BYTE ADDRESS
0096 80     DECLO:   MOVX   A,@R0
0097 07              DEC    A
0098 90              MOVX   @R0,A             ;LOW BYTE -1 STORED

0099 19              INC    R1       ;VALUE BYTE
009A B809            MOV    R0,#VNDCSH +2
009C F1              MOV    A,@R1
009D F461            CALL   TRIFAD   ;ADD VEND VALUE TO VENDED CASH

009F B80F            MOV    R0,#VNDCNT +2
00A1 2301            MOV    A,#01H
00A3 F461            CALL   TRIFAD   ;ADD ONE VENT COUNT
00A5 04AD            JMP    RSTXBF

00A7 19     CSHBOX:  INC    R1       ;VALUE BYTE
00A8 B80C            MOV    R0,#BOXCSH +2
00AA F1              MOV    A,@R1
00AB F461            CALL   TRIFAD

00AD B9FD   RSTXBF:  MOV    R1,#ACDPM         ;RESET THE XRAM MESS.
00AF 27              CLR    A
00B0 91              MOVX   @R1,A
00B1 19              INC    R1
00B2 91              MOVX   @R1,A

00B3 B938   RSTBUF:  MOV    R1,#ACDBUF
00B5 27              CLR    A
00B6 A1              MOV    @R1,A
00B7 19              INC    R1
00B8 A1              MOV    @R1,A
00B9 19              INC    R1
00BA A1              MOV    @R1,A

00BB 65              STOP   TCNT
00BC 35              DIS    TCNTI
00BD 04C6            JMP    EXTACD

                    ;EXIT AFTER 1ST CHAR, SET ACDCNT BIT 7 AND LOAD THE
                    ;TIMER FOR 20MS. THIS BIT WILL BE RESET WHEN THE
                    ;SECOND BYTE'S START BIT CAUSES AN INT. IF THE TIMER
```

```
                ;OVERFLOWS BEFOR THE 2ND BYTE STARTS AN ERROR IS DECLARED
                ;AND THE ACDBUF IS RESET.

00BF 4380       FSTEXT: ORL     A,#80H
00C1 A0                 MOV     @R0,A           ;BIT 7 SET IN ACDCNT
00C2 23E6               MOV     A,#250D NOT
00C4 54DC               CALL    LDTIME          ;TIMER SET TO 2.0 MS

00C6 FE         EXTACD: MOV     A,R6      ;RESTORE P2 OUTPUTS
00C7 3A                 OUTL    P2,A
00C8 240E               JMP     RETNI -2

                $EJECT

                ;THE NEGATIVE GOING EDGE OF THE T1 PIN IS DETECTED HERE.
                ;HOWEVER IF THE DATABOX IS POWERED FROM THE DATAREADER
                ;THE T1 PIN IS PERMENANTLY HIGH. THIS ROUTINE WILL THEN
                ;COUNT INTERNAL TIME TO EFFECT A TIMEOUT OF THE "SLEEP"
                ;TIMER.

00CA B90C       NEGEDG: MOV     R1,#12D

00CC BBC3       LOADR3: MOV     R3,#195D        ;R3 & R2 = .5SEC.
00CE BAE6               MOV     R2,#230D

00D0 B805               MOV     R0,#05H         ;DEBOUNCE THE T1 PIN
00D2 46D2       T1TST1: JNT1    T1TST1    ;WAIT FOR NEG. GOING EDGE
00D4 E8D2               DJNZ    R0,T1TST1

00D6 B805               MOV     R0,#05H
00D8 56DD       T1TST2: JT1     COUNT
00DA E8D8               DJNZ    R0,T1TST2
00DC 83                 RET

00DD EAD8       COUNT:  DJNZ    R2,T1TST2
00DF EBD8               DJNZ    R3,T1TST2

00E1 8A60               ORL     P2,#60H         ;ENABLE INTERUPTS
00E3 05                 EN      I

00E4 E9CC               DJNZ    R1,LOADR3

00E6 B8E5               MOV     R0,#SLPTIM
00E8 80                 MOVX    A,@R0
00E9 C6CA               JZ      NEGEDG
00EB 07                 DEC     A
00EC 90                 MOVX    @R0,A
00ED 04CA               JMP     NEGEDG

                $EJECT
0100                    ORG     100H

                ;INTERUPT SERVICE ROUTINE

                ;AN EXTERNAL INTERUPT CAN BE FROM ANY OF THREE SOURCES.
                ;1. A POWER DOWN WARNING.
                ;2. A DATA LINK MESSAGE.
                ;3. AN A.C.D. BUS MESSAGE.

                ;1. IF THE INTERUPT IS POWER DOWN WARNING-- WATCH THE
                ;POWER DOWN INPUT-- IF IT REMAINS LOW, LOCK UP UNTIL
                ;HARDWARE RESET OCCURS. IF IT RETURNS HIGH AND STAYS
                ;FOR XXMS ,UNINTERUPTED, EXECUTE A SOFTWARE RESET.
                ;
                ;2. IF THE INTERUPT IS THE DATA LINK-- READ THE MESSAGE
                ;INTO THE DATA BUFFER (DATBUF).
                ;
                ;3. IF THE INTERUPT IS THE A.C.D. BUS THE TIMER INTERUPT
                ;WILL BE ENABLED TO ALLOW SIMULTANIOUS NORMAL ACTIVITY
```

```
          ;AND A.C.D. MESSAGE RECEPTION.

0100 9A9F INTRSV: ANL    P2,#(ACDINH OR LNKINH) NOT
0102 00           NOP
0103 00           NOP
0104 8621         JNI    TSTRST          ;GO WAIT FOR RESET
0106 54E5         CALL   LDHALF          ;START THE 400US TIMER
0108 09           IN     A,P1
0109 37           CPL    A
010A 1215         JB0    RECACD  ;GO RECEIVE THE A.C.D. BUS
010C 9239         JB4    RECLNK  ;GO RECEIVE THE DATA LINK

010E 8A20         ORL    P2,#ACDINH      ;ENABLE ACD INTERUPT
0110 8600 RETNI:  JNI    INTRSV
0112 FF           MOV    A,R7
0113 C5           SEL    RB0
0114 93           RETR

          ;RECEIVE THE ACD BUS, SET UP TO RECEIVE A WORD FROM
          ;THE ACD BUS.

0115 25   RECACD: EN     TCNTI
0116 B83D         MOV    R0,#ACDCNT      ;BIT & BYTE COUNTER
0118 F0           MOV    A,@R0
0119 B040         MOV    @R0,#40H        ;SEE NOTES AT ACDREC
011B 921F         JB4    EXRACD          ;FOR BIT SIGNIFICANCE
011D B050         MOV    @R0,#50H
011F 2410 EXRACD: JMP    RETNI



          ;TEST THE POWER DOWN WARNING PIN
          ;IF LOW WAIT FOR HARDWARE RESET. IF HIGH FOR 50MS
          ;FORCE SOFTWARE RESET

0121 8A80 TSTRST: ORL    P2,#XRAMCS      ;DESELECT XRAM
0123 8902         ORL    P1,#OPLED       ;KILL THE L.E.D.
0125 BA64         MOV    R2,#100D        ;100MS DELAY TIME
0127 B964         MOV    R1,#100D
0129 8621 TSTINT: JNI    TSTRST
012B E929         DJNZ   R1,TSTINT
012D EA27         DJNZ   R2,TSTINT -2

012F 2309 SFTRST: MOV    A,#09H          ;STACK PNTR=1
0131 D7           MOV    PSW,A
0132 B808         MOV    R0,#08H         ;1ST STACK ADDRESS
0134 27           CLR    A
0135 A0           MOV    @R0,A
0136 18           INC    R0
0137 A0           MOV    @R0,A
0138 93           RETR           ;SOFTWARE RESET & CLEAR
                                 ;INTERUPT HARDWARE


          $EJECT


0139 B8E5 RECLNK: MOV    R0,#SLPTIM      ;IF THE SLEEP TIMER IS
013B 80           MOVX   A,@R0           ;ACTIVE IGNOR LINK
013C 960E         JNZ    RETNI -2

013E BA0F         MOV    R2,#15D ;TEST FOR VALID START BIT BEFOR
0140 09   LNKTST: IN     A,P1    ;COMMITING TO THE DATA LINK
0141 920E         JB4    RETNI -2
0143 EA40         DJNZ   R2,LNKTST

0145 C5           SEL    RB0
0146 349B         CALL   SETUP   ;SET UP TO RECIEVE HEADER
0148 BA08 RECLOP: MOV    R2,#08H         ;# OF BTS/BYT TO R'CVE
014A B000         MOV    @R0,#00H        ;CLEARED FOR INPUT
014C 54E1 WAIT1:  CALL   HLFBIT  ;WAIT FOR THE 400US OVERFLOW
                                 ;AND START THE 800US TIMER
```

```
014E 09      RTSBIT:  IN     A,P1          ;RETEST START BIT
014F 9264             JB4    ERRJMP
0151 54D5    LOOP11:  CALL   FULBIT        ;FULL BIT TIMING
0153 09               IN     A,P1
0154 47               SWAP   A
0155 5301             ANL    A,#01H        ;KILL EXTRANEOUS BITS
0157 40               ORL    A,@R0         ;COMBINE WITH OTHER
0158 77               RR     A             ;ROTATE TO POSTION
0159 A0               MOV    @R0,A         ;AND SAVE
015A E7               RL     A
015B 7474             CALL   CRC16    ;ADD THIS BIT TO THE CRC-16
015D EA51             DJNZ   R2,LOOP11

015F 54D5             CALL   FULBIT
0161 09      STPBIT:  IN     A,P1          ;STOP BIT TEST
0162 9266             JB4    BUFTST        ;GO TEST BUFFER POINTER
0164 24A6    ERRJMP:  JMP    ERR1




;IF THE INCOMING MESSAGE IS GREATER THAN THE BUFFER SIZE
;KEEP RECEIVING TO LOCATION 3EH. THIS DATA BOX IS NEVER
;CONCERNED WITH THE DATA THAT WILL BE LOST. THE ENTIRE
;MESSAGE MUST STILL BE RECEIVED TO ACCOMPLISH CRC-16.

0166 F8      BUFTST:  MOV    A,R0
0167 03C2             ADD    A,#3DH NOT
0169 C66C             JZ     DCB1     ;IF R0=3EH SKIP THE INC.
016B 18               INC    R0
016C FB      DCB1:    MOV    A,R3     ;DECREMENT THE COUNT BYTES
016D C671             JZ     DCB3
016F EB90    DCB2:    DJNZ   R3,STRTWT
0171 FC      DCB3:    MOV    A,R4
0172 CC               DEC    R4
0173 966F             JNZ    DCB2

;IF "COUNT"=0  CHECK CRC-16 BLOCK CHECK CHAR.

0175 FD      CHKBCC:  MOV    A,R5     ;IF "COUNT"=0 CHECK CRC
                                      ;IF THE BLOCK CHECK CHAR.
0176 4E               ORL    A,R6     ;IS NOT ZERO THEN GOTO
0177 9664             JNZ    ERRJMP   ;ERROR ROUTINE

0179 B6B5             JF0    PROCM    ;IF F0=1, THIS IS THE END
                                      ;OF THE DATA PORTION AND
                                      ;THE MESSAGE SHOULD BE PROCESSED
                                      ;IF F0=0, THIS IS THE END
                                      ;OF THE HEADER
017B B918             MOV    R1,#DATBUF    ;1ST CHAR. ADDRESS
017D F1               MOV    A,@R1         ;TEST FOR "ENQ" CHAR.
017E 03FA             ADD    A,#ENQ NOT    ;IF YES, THIS IS END
0180 17               INC    A             ;OF THE MESSAGE
0181 C6B5             JZ     PROCM         ;IF NO, DATA WILL FOLLOW

0183 95               CPL    F0       ;SET FOR DATA PORTION
0184 19               INC    R1       ;2ND CHAR. ="COUNT" LOWBYTE
0185 F1               MOV    A,@R1    ;FOR THE DATA PORTION
0186 0302             ADD    A,#02D   ;"COUNT" + 2 FOR DATA CRC
0188 AB               MOV    R3,A     ;INTO R3 SETS LOWBYTE COUNT
0189 19               INC    R1       ;3RD CHAR.= COUNT HIGHBYTE
018A F1               MOV    A,@R1
018B 537F             ANL    A,#80H NOT    ;KILL THE LAST MESS BIT
018D 1300             ADDC   A,#00H   ;ADD LOWBYTE CARRY INTO HIGHBYTE
018F AC               MOV    R4,A


0190 743E    STRTWT:  CALL   LD1SEC        ;1 SEC. TIMEOUT
0192 162F    TSTBIT:  JTF    SFTRST
0194 09               IN     A,P1     ;NEW START BIT ???
0195 9292             JB4    TSTBIT
0197 54E5             CALL   LDHALF
```

```
0199 244B                    JMP     RECLOP                  ;GO GET NEXT BYTE



019B 85          SETUP:      CLR     F0          ;HEADER VS. DATA PORTION
019C 27                      CLR     A
019D AE                      MOV     R6,A                    ;MOST SIG. CRC BYTE
019E AD                      MOV     R5,A                    ;LEAST SIG. CRC BYTE
019F B818                    MOV     R0,#DATBUF              ;INPUT BUFFER ADDRESS
01A1 BB08                    MOV     R3,#08H                 ;HEADER BYTE CNTER
01A3 BC00                    MOV     R4,#00H
01A5 83                      RET



                 ;LED COMM. ERROR HANDLING
                 ;IF COMM. ERROR OCCURED IN START MESSAGE, JUST TIMEOUT
                 ;AND RESET. IF IT OCCURED AFTER THE START WAS ACCEPTED
                 ;SEND "NACK" THEN WAIT FOR NEW TRANSMISSION.

01A6 B83F        ERR1:       MOV     R0,#COMSTA              ;BIT 0 =STRT RECIEVED
01A8 F0                      MOV     A,@R0
01A9 92B1                    JB4     CALLSN                  ;GO SEND "NACK"
01AB 7445                    CALL    LOQSEC                  ;1/4 SEC. TIMEOUT
01AD 162F        WAIT2:      JTF     SFTRST
01AF 24AD                    JMP     WAIT2

01B1 7422        CALLSN:     CALL    SNACK       ;SEND "NACK"
01B3 2490                    JMP     STRTWT




                 ;PROCESS THE MESSAGE REIEVED
                 ;THE MESSAGE IS ASSUMED TO BE RESIDING IN THE
                 ;INT. RAM BEGINING WITH "DATBUF".
                 ;IF THE 1ST CHAR. IS "SOH" THEN F0 IS SET AND THIS
                 ;IS A DATA MESSAGE
                 ;IF IT IS THE "ENQ" CHAR. THE IT IS A CONTROL MESSAGE

01B5 7435        PROCM:      CALL    WAIT10                  ;10 MS QUIET PERIOD
01B7 B6E6                    JF0     MPJRDM                  ;REVIEVED DATA MESSAGE
01B9 B818        RENQM:      MOV     R0,#DATBUF
01BB F0                      MOV     A,@R0                   ;GET THE CHAR.
01BC 03FA                    ADD     A,#ENQ NOT              ;COMPARE FOR "ENQ"
01BE 17                      INC     A
01BF 96A6                    JNZ     ERR1                    ;UNRECOGNIZABLE CHAR.

01C1 18                      INC     R0                      ;NEXT CHAR.=TYPE
01C2 F0                      MOV     A,@R0                   ;GET THE CHAR.
01C3 03FE                    ADD     A,#ACK NOT              ;COMPARE FOR "ACK"
01C5 17                      INC     A
01C6 C62F                    JZ      SFTRST                  ;ACK RECIEVED, RESET

01C8 F0                      MOV     A,@R0                   ;GET THE CHAR.
01C9 03FD                    ADD     A,#NACK NOT             ;COMPARE FOR "NACK"
01CB 17                      INC     A
01CC C6D8                    JZ      RNACK       ;GO PROCESS NACK RECIEVED

01CE F0                      MOV     A,@R0                   ;GET THE CHAR.
01CF 03F9                    ADD     A,#SRT NOT              ;COMPARE FOR "START"
01D1 17                      INC     A
01D2 96A6                    JNZ     ERR1        ;UNRECOGNIZABLE COMMAND




                 ;RECIEVED START COMMAND

01D4 7400        RSTRT:      CALL    SSTACK      ;SEND START ACK.
```

```
01D6 4495          JMP     STUPWT  ;SET UP & WAIT FOR MORE INFO

             ;RECIEVED 'NACK' MESSAGE

01D8 B83F    RNACK:  MOV     R0,#COMSTA        ;BT 1=SEC.CDE. VERIFIED
01DA 27              CLR     A
01DB 30              XCHD    A,@R0   ;GET [illegible] NACK COUNTER
01DC 07              DEC     A
01DD 30              XCHD    A,@R0   ;PUT IT BACK
01DE C62F            JZ      SFTRST            ;IF ZERO TRY NO MORE
01E0 F0              MOV     A,@R0
01E1 37              CPL     A
01E2 B62F    B5TST:  JB5     SFTRST            ;RESET
01E4 4459            JMP     SDATAM

01E6 4400    MPJRDM: JMP     RDATAM


             $EJECT
0200                 ORG     200H

             ;RECEIVED DATA MESSAGE

0200 9A7F    RDATAM: ANL     P2,#80H NOT
0202 74B0            CALL    VERCDE  ;GO VERIFY SEC. CDE

0204 B918            MOV     R1,#DATBUF        ;TEST FOR DATA MESSAGE
0206 F1              MOV     A,@R1
0207 037E            ADD     A,#SOH NOT
0209 17              INC     A
020A C654            JZ      INCINT            ;IF 0 SEND DATA MESSAGE
020C F1              MOV     A,@R1             ;TEST FOR MAINTENANCE
020D 036F            ADD     A,#DLE NOT
020F 17              INC     A
0210 961B            JNZ     MPJER1

0212 B81D            MOV     R0,#DATBUF +5     ;MES. TYPE LOC.
0214 B926            MOV     R1,#DATBUF +14D   ;SERIAL NO. LOC.
0216 F0              MOV     A,@R0   ;GET MAINTENANCE MES. TYPE
0217 9250            JB4     CALTST  ;CLEAR & TEST COMMAND
0219 B21D            JB5     LDDATA  ;LOAD SER. NO. & MASK BYTES
021B 24A6    MPJER1: JMP     ERR1    ;IF NONE OF THE ABOVE--ERROR

             ;LOAD ROUTINE

021D B804    LDDATA: MOV     R0,#SERNO         ;XRAM LOC.
021F BA03    LOAD3:  MOV     R2,#03H           ;3 BYTE XFER
0221 5449            CALL    LOOP9
0223 B8E7    LDMASK: MOV     R0,#INSTA1        ;XRAM LOC.
0225 BA15            MOV     R2,#21D           ;21 BYTE XFER
0227 5449            CALL    LOOP9

             ;GENERATE THE # OF COUNTED ITEMS (CNTED) AND THE
             ;# OF TIME DURATION (TIMDUR) ITEMS.
             ;CONVERT THR 24 BIT LINEAR INTPUT MASKS INTO BINARY
             ;NUMBERS FOR STORAGE IN XRAM.

0229 B8E7            MOV     R0,#INSTA1        ;COUNTED MASK
022B B9DE            MOV     R1,#CNTED
022D BA02            MOV     R2,#02H           ;TWO DECODES TO DO
022F BB03    CNVTM:  MOV     R3,#03H           ;THREE BYTES PER DECODE
0231 BC00            MOV     R4,#00H           ;COUNTER
0233 BD08    CNVTM1: MOV     R5,#08H           ;8 BITS PER BYTE
0235 80              MOVX    A,@R0             ;GET LINEAR DATA
0236 37              CPL     A
0237 F23A    B7TST:  JB7     RALEFT
0239 1C              INC     R4
023A E7      RALEFT: RL      A
023B ED37            DJNZ    R5,B7TST
023D 18              INC     R0
023E EB33            DJNZ    R3,CNVTM1
```

```
0240 FC                   MOV     A,R4            ;GET # OF 'ONES'
0241 91                   MOVX    @R1,A           ;STORED
0242 19                   INC     R1
0243 EA2F                 DJNZ    R2,CNVTM

0245 741C       CSACK:    CALL    SACK            ;SEND 'ACK'
0247 4495       JMPRST:   JMP     STUPWT

0249 F1         LOOP9:    MOV     A,@R1           ;XFER OUT LOOP
024A 90                   MOVX    @R0,A
024B 18                   INC     R0
024C 19                   INC     R1
024D EA49                 DJNZ    R2,LOOP9
024F 83                   RET

0250 7449       CALTST:   CALL    TSTXRM
0252 4445                 JMP     CSACK



                $EJECT

0254 B810       INCINT:   MOV     R0,#INTCNT      ;ADD ONE TO THE INTERRO-
0256 80                   MOVX    A,@R0           ;GATION COUNTER
0257 17                   INC     A
0258 90                   MOVX    @R0,A

                ;DETERMINE THE SIZE OF THE FILE TO BE TRANSMITTED

0259 B8DE       SDATAM:   MOV     R0,#CNTED       ;ADDRESS # OF CNTD LINES
025B 80                   MOVX    A,@R0
025C E7                   RL      A               ;CNTED'S TIMES TWO
025D AA                   MOV     R2,A            ;TEMP SAVE
025E 18                   INC     R0              ;ADDRESS # OF TIM LINES
025F 80                   MOVX    A,@R0
0260 E7                   RL      A
0261 E7                   RL      A
0262 E7                   RL      A               ;TIMES 8
0263 A9                   MOV     R1,A            ;SAVE
0264 80                   MOVX    A,@R0           ;GET # OF TIMDURS AGAIN
0265 69                   ADD     A,R1            ;(# * 8) + # == # * 9
0266 6A                   ADD     A,R2            ;ADD IN COUNTEDS
0267 0314                 ADD     A,#STOCK        ;ADD IN THE STANDARD

                ;SET UP THE HEADER AND TRANSMIT IT
0269 746A       HEADER:   CALL    CLRBUF          ;CLEAR THE DATA BUFFER
026B B081                 MOV     @R0,#SOH        ;"SOH" CHAR
026D 18                   INC     R0
026E A0                   MOV     @R0,A           ;"COUNT" FROM ABOVE
026F 18                   INC     R0
0270 B080                 MOV     @R0,#LSTMES     ;"LAST MESSAGE"
0272 740A                 CALL    XMIT6   ;XMIT 6 CHAR. & BCC

                ; XMIT THE DATA FILE
0274 B804       DUMP:     MOV     R0,#SERNO       ;XRAM LOC.
0276 2314                 MOV     A,#STOCK
0278 AB         SNDSTK:   MOV     R3,A
0279 54A3                 CALL    XMTDX   ;XMIT R3 BYTES FROM XRAM

027B B818       SNDCNT:   MOV     R0,#RAM ;FIRST DATA ADDRESS
027D B9DE                 MOV     R1,#CNTED       ;ADDRESS # OF CNTEDS
027F 81                   MOVX    A,@R1
0280 C686                 JZ      SNDTMD
0282 E7                   RL      A               ;* 2=# OF BYTES
0283 AB                   MOV     R3,A
0284 54A6                 CALL    XMITX   ;XMIT R3 BYTES FROM XRAM

0286 19         SNDTMD:   INC     R1              ;ADDRESS # OF TIMDURS
0287 81                   MOVX    A,@R1
0288 A9                   MOV     R1,A    ;STORE # OF TIMDURS IN R1
```

```
0289 C693              JZ      SNDBCC    ;IF #=0 SEND BCC
028B BB09    TMDLOP:   MOV     R3,#09H   ;# OF BYTES PER TIMDUR
028D 54A6              CALL    XMITX     ;XMIT R3 BYTES FROM XRAM
028F 18                INC     R0        ;SKIP TIMER BYTE
0290 18                INC     R0        ;SKIP OFF TIMER BYTE ALSO
0291 E98B              DJNZ    R1,TMDLOP

0293 7410    SNDBCC:   CALL    XMTBCC
0295 349B    STUPWT:   CALL    SETUP     ;SET UP FOR RECIEVE
0297 2490              JMP     STRTWT    ;GO WAIT FOR "ACK"



             $EJECT

             ;TRANSMIT DATA MODULE
             ;EXPECTED INFO:
             ; R3=NUMBER OF BYTES TO TRANSMIT
             ; R0=INT. RAM ADDRESS OF 1ST CHAR. TO BE SENT
             ;USES:
             ; R2=BIT COUNTER
             ; R5=LSB BCC
             ; R6=MSB BCC
             ; R7=TEMP STORAGE

0299 27      XMTDI:    CLR     A         ;INT RAM TRANSMIT ROUTINE
029A AD                MOV     R5,A
029B AE                MOV     R6,A      ;BCC CLEARED
029C F0      XMITI:    MOV     A,@R0               ;GET DATA WORD
029D 54AD              CALL    XMTCOM
029F 18                INC     R0
02A0 EB9C              DJNZ    R3,XMITI
02A2 83                RET

02A3 27      XMTDX:    CLR     A         ;XRAM TRANSMIT ROUTINE
02A4 AD                MOV     R5,A
02A5 AE                MOV     R6,A      ;BCC CLEARED
02A6 80      XMITX:    MOVX    A,@R0
02A7 54AD              CALL    XMTCOM
02A9 18                INC     R0
02AA EBA6              DJNZ    R3,XMITX
02AC 83                RET

             ;TRANSMIT COMMON ROUTINE

02AD AF      XMTCOM:   MOV     R7,A                ;TEMP STORAGE
02AE BA08              MOV     R2,#08H             ;BIT COUNTER
02B0 54DA              CALL    LDFULL    ;START THE FULL BIT TIMER
02B2 54E9              CALL    OUT0                ;START BIT

02B4 54D5    XMTLOP:   CALL    FULBIT              ;WAIT AND RESTART
02B6 FF                MOV     A,R7
02B7 12BD              JB0     OUT1
02B9 54E9              CALL    OUT0                ;OUTPUT A ZERO
02BB 44BF              JMP     NXTBIT
02BD 8A10    OUT1:     ORL     P2,#10H             ;OUTPUT A ONE

02BF FF      NXTBIT:   MOV     A,R7                ;ROTATE FOR NEXT BIT
02C0 77                RR      A
02C1 AF                MOV     R7,A
02C2 EAB4              DJNZ    R2,XMTLOP

02C4 54D5              CALL    FULBIT              ;WAIT BIT TIME
02C6 8A10              ORL     P2,#10H             ;STOP BIT
02C8 BA08    CRC:      MOV     R2,#08H
02CA FF      CRCLP:    MOV     A,R7
02CB 7474              CALL    CRC16
02CD FF                MOV     A,R7
02CE 77                RR      A
02CF AF                MOV     R7,A
```

```
02D0 EACA          DJNZ   R2,CNULP
02D2 54D5          CALL   FULBIT            ;ONE FULL STOP BIT

02D4 83            RET


     $EJECT
     ;1200 BAUD TIMING ROUTINES USING THE INTERNAL TIMER.
     ;THE XTAL IS ASSUMED TO BE 6MHZ.

02D5 1609    FULBIT: JTF    ADJFUL   ;IF OVERFLOW GO ADJUST TIMING
02D7 44D5          JMP    FULBIT

02D9 09      ADJFUL: IN     A,P1     ;SINGLE BYTE, 2 CYCLE INSTUCTION
02DA 23F6    LDFULL: MOV    A,#TIMER2 NOT    ;800US
02DC 16DE    LDTIME: JTF    STRTT
02DE 62      STRTT:  MOV    T,A
02DF 55            STRT   T                 ;RESETS PRESCALER
02E0 83            RET

02E1 16DA    HLFBIT: JTF    LDFULL
02E3 44E1          JMP    HLFBIT
02E5 23FB    LDHALF: MOV    A,#TIMER1 NOT    ;400US
02E7 44DC          JMP    LDTIME



     ;OUTPUT A ZERO TO THE OPTICS


02E9 2315    OUT0:   MOV    A,#21D
02EB 9AEF    OUT01:  ANL    P2,#10H NOT
02ED 9AEF          ANL    P2,#10H NOT
02EF 9AEF          ANL    P2,#10H NOT
02F1 00            NOP
02F2 8A10          ORL    P2,#10H
02F4 8A10          ORL    P2,#10H
02F6 07            DEC    A
02F7 96EB          JNZ    OUT01
02F9 83            RET




     $EJECT

0300               ORG    300H

     ;SEND START ACKNOLEDGE
0300 B83F    SSTACK: MOV    R0,#COMSTA        ;BIT 4=STACK SENT
0302 F0            MOV    A,@R0
0303 4310          ORL    A,#10H
0305 A0            MOV    @R0,A
0306 742B          CALL   SNDCOM
0308 B007          MOV    @R0,#STCK         ;"STACK"
030A B818    XMIT6:  MOV    R0,#DATBUF
030C BB06          MOV    R3,#06D           ;SIX BYTES TO XMIT
030E 5499          CALL   XMTDI             ;XMIT DATA

     ;TRANSMIT THE CRC-16 BLOCK CHECK CHAR.
     ;TAKE THE BCC FROM R5 & R6 AND PLACE IN RAM,& TRANSMIT
0310 B818    XMTBCC: MOV    R0,#DATBUF
0312 FD            MOV    A,R5
0313 A0            MOV    @R0,A
0314 18            INC    R0
0315 FE            MOV    A,R6
0316 A0            MOV    @R0,A
0317 C8            DEC    R0
0318 BB02          MOV    R3,#02   ;TWO CHAR. XMIT
031A 449C          JMP    XMITI
```

```

                    ;SEND THE 'ACK' MESSAGE
031C 7428           SACK:    CALL    SNDCOM          ;SET UP HEADER
031E B001                    MOV     @R0,#ACK        ;INSERT "ACK"
0320 640A                    JMP     XMIT6           ;SEND IT

                    ;SEND "NACK"
0322 742B           SNACK:   CALL    SNDCOM
0324 B002                    MOV     @R0,#NACK       ;"NACK"
0326 640A                    JMP     XMIT6

0328 B81C           SNDCOM:  MOV     R0,#DATBUF +4
032A BA04                    MOV     R2,#04H
032C 27                      CLR     A
032D A0             SNDLOP:  MOV     @R0,A
032E C8                      DEC     R0
032F EA2D                    DJNZ    R2,SNDLOP
0331 B005                    MOV     @R0,#ENQ        ;INSERT "ENQ" CHAR
0333 18                      INC     R0              ;POINT AT BYTE 2
0334 83                      RET

                    $EJECT


                    ;WAIT 10MS ROUTINE
0335 2382           WAIT10:  MOV     A,#125D NOT     ;125 * 80US = 10MS
0337 62                      MOV     T,A
0338 55                      STRT    T
0339 163D           TFTST:   JTF     RET3
033B 6439                    JMP     TFTST
033D 83             RET3:    RET

                    ;LOAD 1 SECOND TIME INTO THE TIMER AND START THE
                    ;COUNTER 60 * 16.666MS = 1SEC

033E 23C3           LD1SEC:  MOV     A,#60D NOT

0340 1642           LDCNTR:  JTF     STRTC
0342 62             STRTC:   MOV     T,A
0343 45                      STRT    CNT
0344 83                      RET

0345 23F0           LDQSEC:  MOV     A,#15D NOT
0347 6440                    JMP     LDCNTR


                    ;TEST AND CLEAR THE EXTERNAL DATA MEMORY
0349 B800           TSTXRM:  MOV     R0,#00H ;256 BYTES TO CHECK
034B 23FF           TSTLOP:  MOV     A,#0FFH
034D 90                      MOVX    @R0,A   ;WRITE ONES
034E 80                      MOVX    A,@R0   ;READ IT
034F 37                      CPL     A
0350 965E                    JNZ     TSTERR  ;JUMP IF ERROR
0352 90                      MOVX    @R0,A   ;WRITE ZERO
0353 80                      MOVX    A,@R0   ;READ IT
0354 965E                    JNZ     TSTERR  ;JUMP IF ERROR
0356 E84B                    DJNZ    R0,TSTLOP
0358 B8FC           LDVAL:   MOV     R0,#VALID
035A 235A                    MOV     A,#VALBYT       ;VALIDITY VALUE
035C 90                      MOVX    @R0,A
035D 83                      RET

035E B81D           TSTERR:  MOV     R0,#DATBUF +5   ;ERR MESSAGE LOC
0360 B001                    MOV     @R0,#01H
0362 83                      RET

                    ;EXTERNAL RAM VALIDITY TEST
                    ;RETURN 00 IN THE ACC. FOR GOOD TEST
0363 B8FC           VALCHK:  MOV     R0,#VALID       ;TEST EXTERNAL RAM
```

```
0365 80          MOVX    A,@R0            ;VALIDITY NIBBLES
0366 03A5        ADD     A,#VALBYT NOT    ;COMPARE WITH
0368 17          INC     A                ;VALIDITY BYTE
0369 83          RET


036A B83E   CLRBUF:  MOV     R0,#DATEBUF +38D
036C BA26        MOV     R2,#38D
036E C8     LOOP18:  DEC     R0               ;CLEAR N BYTES
036F B000        MOV     @R0,#00H
0371 EAAE        DJNZ    R2,LOOP18
0373 83          RET
            $EJECT



            ;THIS MODULE COMPUTES A CRC-16 BLOCK CHECK CHARACTOR
            ;IN REGISTERS R5 & R6 BASED ON THE PREVIOUS, OR EXIST-
            ;ING, VALUE IN R5 & R6 AND THE NEW DATA BIT TRANSMITTED
            ;IN THE LEAST SIGNIFICANT BIT OF THE ACCUMULATOR.
            ;THE LSB OF THE BCC IS THE LSB OF R5, AND THE MSB OF
            ;THE BCC IS THE MSB OF R6.

0374 97     CRC16:   CLR     C                ;START OUT CLEAN
0375 5301        ANL     A,#01H           ;KILL ANY EXTRA INFO
0377 DD          XRL     A,R5             ; X^16 ELEMENT
0378 127D        JB0     STCRRY           ;IF TRUE SET THE CARRY

037A FE          MOV     A,R6     ;IF X^16 XOR=0 JUST ROTATE
037B 6485        JMP     ROTATE

037D A7     STCRRY:  CPL     C
037E 2302        MOV     A,#02H
0380 DD          XRL     A,R5             ; X^15 ELEMENT
0381 AD          MOV     R5,A
0382 2340        MOV     A,#40H
0384 DE          XRL     A,R6             ; X^2 ELEMENT

0385 67     ROTATE:  RRC     A        ;ROTATE THE MS BYTE
0386 AE          MOV     R6,A             ;SAVE IT
0387 FD          MOV     A,R5
0388 67          RRC     A        ;ROTATE THE LS BYTE
0389 AD          MOV     R5,A             ;SAVE IT
038A 83          RET



038B B923   WRONG:   MOV     R1,#DATEBUF +11  ;SECOND CODE LOC
038D 95          CPL     F0
038E B6B3        JF0     COMPAR -4
0390 B8E5        MOV     R0,#SLPTIM       ;1 MIN. "SLEEP" TIMERER
0392 230A        MOV     A,#10D           ;10 * 6SEC.=1 MIN.
0394 90          MOVX    @R0,A
0395 B811        MOV     R0,#SLPCNT
0397 80          MOVX    A,@R0
0398 17          INC     A
0399 90          MOVX    @R0,A    ;ADD ONE TO THE SLEEP COUNTER

            ;SEND SERIAL NUMBER ONLY MESSAGE

039A 746A        CALL    CLRBUF
039C B081        MOV     @R0,#SOH
039E 18          INC     R0
039F B003        MOV     @R0,#03H         ;COUNT
03A1 18          INC     R0
03A2 B080        MOV     @R0,#LSTMES
03A4 740A        CALL    XMIT6            ;6 BYTES + BCC
03A6 B804        MOV     R0,#SERNO
```

```
03A8 BB03          MOV     R3,#03H
03AA 54A3          CALL    XMTDX
03AC 7410          CALL    XMTECC
03AE 242F          JMP     SETRST



03B0 B920   VERCDE: MOV    R1,#DATBUF +8
03B2 85            CLR     F0

03B3 B801          MOV     R0,#SECCOD      ;XRAM LOC.
03B5 BA03          MOV     R2,#03H         ;TRIPLE COMPARE
03B7 80     COMPAR: MOVX   A,@R0           ;INT. BYTE
03B8 37            CPL     A
03B9 61            ADD     A,@R1           ;PROBE BYTE
03BA 17            INC     A
03BB 96BB          JNZ     WRONG
03BD 18            INC     R0
03BE 19            INC     R1
03BF EAB7          DJNZ    R2,COMPAR

03C1 B823          MOV     R0,#DATBUF +11  ;NEW SEC. CODE LOC.
03C3 B901          MOV     R1,#SECCOD
03C5 BA03          MOV     R2,#03H
03C7 F0     NEWLOP: MOV    A,@R0
03C8 91            MOVX    @R1,A
03C9 18            INC     R0
03CA 19            INC     R1
03CB EAC7          DJNZ    R2,NEWLOP

03CD B83F          MOV     R0,#COMSTA      ;S CDE. OK, IE. DATA 1
03CF F0            MOV     A,@R0           ;RECEIVED, IE 1ST DATA
03D0 4323          ORL     A,#23H          ;2 SENT. SET BIT 5 AND
03D2 A0            MOV     @R0,A           ;SET NACK CNTR TO MAX.
03D3 83            RET

            $EJECT
0400               ORG     400H


            ;EXECUTIVE CONTROL

0400 B400   EXEC:  CALL    ACIN1     ;GO READ THE L1 INPUTS

0402 F475          CALL    CCTV      ;GO TEST THE CASH COUNTER
                                     ;AND THE TEST VEND SWITCH


            ;ELAPSED TIMERS, DECREMENT THE MASTER TIMERS, THE SLEEP
            ;TIMER, AND THE TEST VEND TIMER TILL ZERO.
            ;INCREMENT ANY ACTIVE TIME/DURATION TIMERS IF THE
            ;APPROPRIATE MASTER EQUALS ZERO.
            ;INCREMENT THE ELAPSED TIMER IF "SIXMIN" EQUALS ZERO.
            ;RELOAD ANY ZEROED MASTER TIMER.

0404 B8E0   C60HZ: MOV     R0,#ONESEC      ;ONE SEC. CNTR ADRS
0406 80            MOVX    A,@R0           ;GET THE COUNTER
0407 07            DEC     A
0408 90            MOVX    @R0,A
0409 963E          JNZ     DURINC          ;OVERFLOW ?



            ;COMPLEMENT THE OPERATION L.E.D. IF THIS IS DURING A
            ;TEST VEND MINUTE.

040B B8E6   CPLLED: MOV    R0,#TVTIM
040D 80            MOVX    A,@R0     ;GET TVTIM FROM XRAM
040E C619          JZ      C1SEC -2;IF ZERO LIGHT THE LED
0410 09            IN      A,P1
0411 99FD          ANL     P1,#OPLED NOT   ;LED ON
```

```
0413 321B           JB1    C1SEC
0415 8902           ORL    P1,#OPLED          ;LED OFF
0417 841B           JMP    C1SEC

0419 99FD           ANL    P1,#OPLED NOT
041B B8E1   C1SEC:  MOV    R0,#SIXSEC         ;SIX SEC. CNTR ADRS
041D 80             MOVX   A,@R0
041E 07             DEC    A
041F 90             MOVX   @R0,A
0420 963E           JNZ    DURINC


            ;IF THE 6 SEC. COUNTER OVERFLOWS DECREMENT THE OTHER
            ;TIMERS. (ONEMIN, TENMIN, SIXMIN, SLPTIM, TVTIM)

0422 BA05           MOV    R2,#05D            ;FIVE CONTERS TO DEC.
0424 18     DECLOP: INC    R0                 ;ONE MINUTE ADDRESS
0425 80             MOVX   A,@R0
0426 C62A           JZ     NXTDEC             ;IF 0 TRY NEXT TIMER
0428 07             DEC    A
0429 90             MOVX   @R0,A
042A EA24   NXTDEC: DJNZ   R2,DECLOP


042C B8E4   ELTIM:  MOV    R0,#SIXMIN         ;ADDRESS THE 6 MIN. CNTR
042E 80             MOVX   A,@R0
042F 963E           JNZ    DURINC

0431 15             DIS    I                  ;40US MAX.
0432 B813           MOV    R0,#ELPSTM +1      ;ELAPSED TIMER ADDRESS
0434 80             MOVX   A,@R0
0435 17             INC    A
0436 90             MOVX   @R0,A
0437 963D           JNZ    EXELTM
0439 C8             DEC    R0                 ;2ND BYTE
043A 80             MOVX   A,@R0
043B 17             INC    A
043C 90             MOVX   @R0,A
043D 05     EXELTM: EN     I



            ;DURATION INCREMENT, INCREMENT THE DURATION TIMERS, IF
            ;ACTIVE, WHEN THE APPROPRIATE MASTER TIMER IS AT ZERO.

043E B8DE   DURINC: MOV    R0,#CNTED          ;ADDRESS # OF CNTD LINES
0440 80             MOVX   A,@R0              ;GET # OF CNTD LINES
0441 E7             RL     A                  ;TIMES TWO
0442 0321           ADD    A,#RAM +9          ;PLUS START ADDRESS
0444 A9             MOV    R1,A     ;1ST TIMDUR ADDRESS IN R1

0445 18             INC    R0                 ;ADRES # OF TIMDUR LINES
0446 80             MOVX   A,@R0              ;GET # OF TIMDUR LINES
0447 C6CE           JZ     EXEC1              ;IF NO TIMDUR LINES
0449 AA             MOV    R2,A               ;SAVE IN R2

044A 81     DILOOP: MOVX   A,@R1    ;GET TIMER
044B F271           JB7    ACTIVE   ;IF B7=1 TIMER IS ACTIVE

044D 19     NEXTD:  INC    R1       ;OFF COUNTER ADDRESS
044E 81             MOVX   A,@R1
044F 37             CPL    A
0450 F262           JB7    NEXTD1

0452 B8E0           MOV    R0,#ONESEC         ;IF THE OFF COUNTER IS
0454 80             MOVX   A,@R0              ;ACTIVE AND THE SECOND
0455 9662           JNZ    NEXTD1             ;COUNTER =0, THEN COUNT

0457 81             MOVX   A,@R1              ;AFTER THIRY SECONDS
0458 533F           ANL    A,#3FH             ;DECLARING THE ITEM OFF
```

```
045A 03E1               ADD     A,#30D NOT
045C 17                 INC     A
045D C665               JZ      CLRIT

045F 81                 MOVX    A,@R1
0460 17                 INC     A
0461 91                 MOVX    @R1,A
0462 C9       NEXTD1:   DEC     R1                      ;TIMER ADDRESS
0463 8469               JMP     NEXTD2

0465 27       CLRIT:    CLR     A
0466 91                 MOVX    @R1,A
0467 C9                 DEC     R1                      ;TIMER ADDRESS
0468 91                 MOVX    @R1,A

0469 F9       NEXTD2:   MOV     A,R1       ;GET ADDRESS
046A 030B               ADD     A,#11D     ;NEXT ADDRESS
046C A9                 MOV     R1,A
046D EA4A               DJNZ    R2,DILOOP
046F 84CE               JMP     EXEC1

0471 B8E0     ACTIVE:   MOV     R0,#ONESEC
0473 D277               JB6     SCALE      ;IF B6=1 TEST DUR SCALE BITS
0475 8486               JMP     CNT1S

0477 C9       SCALE:    DEC     R1         ;DURATION LOCATION
0478 81                 MOVX    A,@R1      ;GET DURATION CNTR
0479 19                 INC     R1         ;BACK TO TIMER LOC.
047A F280               JB7     HRTST      ;GO TEST BIT 6
047C D285               JB6     CNT6S      ;GO ADD 6 SECONDS
047E 8486               JMP     CNT1S      ;GO ADD 1 SEC.

0480 37       HRTST:    CPL     A
0481 D284               JB6     CNT1M      ;GO ADD 1 MINUTE

0483 18       CNT10M:   INC     R0
0484 18       CNT1M:    INC     R0
0485 18       CNT6S:    INC     R0
0486 80       CNT1S:    MOVX.   A,@R0      ;GET MASTER TIMER "N"
0487 964D               JNZ     NEXTD      ;IF NON-ZERO EXIT
                                           ;IF ZERO COUNT IT
0489 81                 MOVX    A,@R1      ;GET TIMDUR TIMER
048A 17                 INC     A
048B 91                 MOVX    @R1,A      ;PUT IT BACK

048C 533F               ANL     A,#3FH     ;KILL THE CONTROL BITS
048E 03C3               ADD     A,#60D NOT
0490 17                 INC     A
0491 964D               JNZ     NEXTD      ;IF NOT 60 EXIT

0493 81                 MOVX    A,@R1      ;GET THE TIMDUR TIMER
0494 D2E3               JB6     RSTTMR     ;IF B6=1 DO NOT PUSH STACK

0496 F9       PUSH:     MOV     A,R1       ;GET TIMER ADDRESS
0497 03FA               ADD     A,#05 NOT          ;SUBTRACT 6
0499 A8                 MOV     R0,A       ;ADDRESS MSB STACK ENTRY 2
049A 03FD               ADD     A,#02 NOT          ;SUBTRACT 3
049C A9                 MOV     R1,A       ;ADDRESS MSB STACK ENTRY 3

049D B806               MOV     R3,#06H    ;LOOP COUNTER
049F 15                 DIS     I          ;DISABLE INT. 163US

04A0 80       PSHLOP:   MOVX    A,@R0      ;GET NEWEST
04A1 91                 MOVX    @R1,A
04A2 18                 INC     R0
04A3 19                 INC     R1
04A4 EBA0               DJNZ    R3,PSHLOP

04A6 B812               MOV     R0,#ELPSTM         ;ADDRESS PRESENT TIME
04A8 80                 MOVX    A,@R0
04A9 91                 MOVX    @R1,A              ;ELPSD TIME HIGH BYTE
03AA 18                 INC     R0
```

```
04AB 19                    INC     R1
04AC 80                    MOVX    A,@R0
04AD 91                    MOVX    @R1,A          ;ELPSD TIME LOW BYTE
04AE 19                    INC     R1             ;ADDRESS DURATION CNTR
04AF 27                    CLR     A              ;CLEAR THE DURATION BYTE
04B0 91                    MOVX    @R1,A          ;STORED
04B1 05                    EN      I
04B2 19                    INC     R1             ;TIMER ADDRESS

04B3 23C0       RSTTMR:    MOV     A,#0C0H  ;BITS 6&7 HIGH CNTR 0
04B5 91                    MOVX    @R1,A    ;STORED


04B6 C9         INCDUR:    DEC     R1       ;ADDRESS DURATION COUNTER
04B7 81                    MOVX    A,@R1
04B8 17                    INC     A
04B9 91                    MOVX    @R1,A    ;DURATION CNTR INCREMENTED
04BA 533F                  ANL     A,#3FH   ;KILL THE SCALE BITS
04BC 03C3                  ADD     A,#60D NOT
04BE 17                    INC     A
04BF 96CB                  JNZ     EXINC

04C1 81         INCSCL:    MOVX    A,@R1    ;GET THE DATA FRESH
04C2 53C0                  ANL     A,#0C0H  ;ZERO THE CNTR BITS
04C4 0340                  ADD     A,#40H   ;INC. THE SCALE BITS
04C6 E6CA                  JNC     EXINC -1
04C8 23FB                  MOV     A,#0FBH  ;DURATION AT MAXIMUM ALREADY
                                            ;FORCE COUNT OF 59D
04CA 91                    MOVX    @R1,A    ;SAVE NEW DURATION
04CB 19         EXINC:     INC     R1       ;TIMER ADDRESS
04CC 844D                  JMP     NEXTD


04CE B8E0       EXEC1:     MOV     R0,#ONESEC       ;1SECOND COUNTER ADDRESS
04D0 B9E2                  MOV     R1,#RLDDBL LOW   ;RELOAD DEFINE BYTE LIST
04D2 BA05                  MOV     R2,#05D          ;5 TIMERS TO TEST
04D4 80         RLDLOP:    MOVX    A,@R0
04D5 96DA                  JNZ     NXTRLD
04D7 F9                    MOV     A,R1
04D8 A3                    MOVP    A,@A     ;GET THE RELOAD VALUE
04D9 90                    MOVX    @R0,A
04DA 18         NXTRLD:    INC     R0
04DB 19                    INC     R1
04DC EAD4                  DJNZ    R2,RLDLOP


04DE B415       EXEC2:     CALL    ACIN2    ;L2 READ
04E0 A45C                  JMP     PROCAC   ;PROCESS THE A.C. INPUTS

04E2 3C         RLDDBL:    DB      60D
04E3 06                    DB      6D
04E4 0A                    DB      10D
04E5 64                    DB      100D
04E6 3C                    DB      60D
                $EJECT

0500                       ORG     500H

                ;A.C. INPUT HANDLING ROUTINES

0500 14CA       ACIN1:     CALL    NEGEDG

0502 D410                  CALL    TIMED            ;PROC. THE T/D EVENTS
                                                    ;AND WAIT 4MS-CENTER CYCLE

0504 D4A6       ACIN1A:    CALL    READAC           ;READ THE A.C. INPUTS
0506 F41F                  CALL    AND3     ;COMBINE L1 MASK & DATA

0508 B820       SAVE1:     MOV     R0,#ACBUF1       ;SAVE THE L1 READ IN
050A B926                  MOV     R1,#ACBUF3       ;AC BUFFER 3
050C BB03                  MOV     R3,#03H
```

```
050E F0      MOVLOP: MOV    A,@R0
050F A1              MOV    @R1,A
0510 18              INC    R0
0511 19              INC    R1
0512 EB0E            DJNZ   R3,MOVLOP

0514 83      EXITAC: RET



0515 B805    ACIN2:  MOV    R0,#05H
0517 4617    T1TST3: JNT1   T1TST3   ;WAIT HERE FOR POS. GOING EDGE
0519 E817            DJNZ   R0,T1TST3

051B D49E            CALL   FOURMS   ;GO KILL 4MS

051D D4A6    ACIN2A: CALL   READAC             ;READ THE A.C. INPUTS
051F F430            CALL   NAND3    ;COMBINE L1 NOT MASK & DATA

0521 B826    COMB12: MOV    R0,#ACBUF3         ;COMBINE THE L1 READ
0523 B920            MOV    R1,#ACBUF1         ;(BUF3) WITH THE L2
0525 BB03            MOV    R3,#03H
0527 F0      COMBLP: MOV    A,@R0              ;READ (BUF1) AND
0528 41              ORL    A,@R1              ;STORE IN BUFFER 3.
0529 A0              MOV    @R0,A
052A 18              INC    R0
052B 19              INC    R1
052C EB27            DJNZ   R3,COMBLP


052E B831            MOV    R0,#ACINP1 +8      ;PUSH THE LONG STACK
0530 B92E            MOV    R1,#ACINP1 +5      ;& ENTER THE NEW READ
0532 BA09            MOV    R2,#09H            ;NINE BYTES TO MOVE
0534 D497            CALL   LOOP8              ;


             ;UPDATE THE SHORT TERM STACK

0536 B8F6    UDSHRT: MOV    R0,#INSTA6         ;SHORT/LONG MASK
0538 B926            MOV    R1,#ACBUF3         ;LATEST READ
053A F41F            CALL   AND3

053C B800            MOV    R0,#00H            ;UPDATE THE SHORT REG.S
053E B926            MOV    R1,#ACBUF3         ;IF ONE AND ONLY ONE
0540 BA03            MOV    R2,#03H            ;SHORT EVENT IS ON

0542 BB08    CNTLOP: MOV    R3,#08H            ;8 BITS PER BYTE
0544 F1              MOV    A,@R1
0545 37              CPL    A
0546 1249    BOTST:  JB0    ROTACC
0548 18              INC    R0
0549 E7      ROTACC: RL     A
054A EB46            DJNZ   R3,BOTST
054C 19              INC    R1
054D EA42            DJNZ   R2,CNTLOP

054F F8              MOV    A,R0
0550 C65B            JZ     EXAC2
0552 07              DEC    A
0553 965B            JNZ    EXAC2

0555 B928    STRNEW: MOV    R1,#ACBUF3 +2
0557 B837            MOV    R0,#ACSHRT +2      ;STORE NEW SHORT INFO.
0559 D495            CALL   LOOP8 -2

055B 83      EXAC2:  RET


055C B469    PROCAC: CALL   L6EVNT
```

```
055E D400          CALL    COUNTD
0560 B830          MOV     R0,#ACDCNT      ;IF BIT 6=1 THE ACD BUS
0562 F0            MOV     A,@R0           ;IS ACTIVE, DON'T ENABLE
0563 D267          JB6     JMPEXC          ;THE LINK INTERUPT
0565 8A40          ORL     P2,#LNKINH      ;ENABLE THE LINK INT.
0567 8400  JMPEXC: JMP     EXEC

           ;L6 TYPE PROCESSING
0569 B829  L6EVNT: MOV     R0,#ACINP1
056B BA03          MOV     R2,#03H
056D F0    L6LOOP: MOV     A,@R0
056E 37            CPL     A
056F 18            INC     R0
0570 18            INC     R0              ;TEST FOR L6 ON
0571 18            INC     R0              ;IN ALL A.C. BLOCKS
0572 F289          JB7     WITHIN
0574 EA6D          DJNZ    R2,L6LOOP
0576 F0            MOV     A,@R0
0577 F289          JB7     WITHIN          ;AND OFF IN PREV. ON

           ;L6,PRIOR,LONG
0579 F42D  L6PL:   CALL    PRLONG
057B B832          MOV     R0,#ACINP1 +9   ;PREV. ON REG.
057D F448          CALL    INTAND          ;AND MASKS WITH DATA
057F B4C1          CALL    L6CNT     ;GO COUNT EVENTS INTO XRAM

           ;L6,PRIOR,SHORT
0581 F40F  L6PS:   CALL    PRSHRT
0583 B835          MOV     R0,#ACSHRT      ;SHORT TERM STACK
0585 F448          CALL    INTAND          ;AND MASK & DATA
0587 A4C1          JMP     L6CNT


0589 B832  WITHIN: MOV     R0,#ACINP1 +9   ;TEST FOR L6 OFF
058B F0            MOV     A,@R0
058C F28F          JB7     L6WL     ;IF TRUE GO PROCESS
058E 83            RET

           ;L6,WITHIN,LONG
058F F429  L6WL:   CALL    WTHLNG
0591 B4F2          CALL    JUSTON   ;AC1.&AC2.&AC3. &NOT "ON"
0593 B4B4          CALL    UDPCNT   ;UPDATE PREV. CNTED & COUNT IT

           ;L6,WITHIN,SHORT
0595 F40B  L6WS:   CALL    WTHSRT
0597 B835          MOV     R0,#ACSHRT
0599 F448          CALL    INTAND   ;AND ACSHRT WITH ACBUF3
059B B4B4          CALL    UDPCNT   ;UPDATE PREV. CNTED & COUNT IT

059D B829  KILSHT: MOV     R0,#ACINP1      ;IF L6 IS GOING OFF
059F F0            MOV     A,@R0           ;CLEAR THE SHORT TERM
05A0 18            INC     R0
05A1 18            INC     R0              ;REGISTER AND THE L6
05A2 18            INC     R0              ;WITHIN PREV. COUNTED
05A3 40            ORL     A,@R0           ;REGISTER.
05A4 18            INC     R0
05A5 18            INC     R0
05A6 18            INC     R0
05A7 40            ORL     A,@R0
05A8 F2B3          JB7     EXL6            ;IF NOT--JUST EXIT L6'S
05AA B835  CLRSHT: MOV     R0,#ACSHRT
05AC 27            CLR     A
05AD BA06          MOV     R2,#06D         ;6 BYTES TO CLEAR
05AF A0    CLRLOP: MOV     @R0,A
05B0 18            INC     R0
05B1 EAAF          DJNZ    R2,CLRLOP
05B3 83    EXL6:   RET


           ;UPDATE PREVIOUSLY COUNTED INPUTS, USED BY L6 WITHIN
```

```
           ;TO REMOVE ANY PREVIOUSLY COUNTED INPUTS FROM ACBUF3
           ;AND ADD ANY INPUTS BEING COUNTED INTO ACPCNT.
           ;
05B4 B838  UDPCNT:  MOV    R0,#ACPCNT
05B6 F454           CALL   INTNND           ;KILL ANY PREV COUNTED
05B8 BB03           MOV    R3,#03H
05BA C8    ADDNEW:  DEC    R0
05BB C9             DEC    R1
05BC F1             MOV    A,@R1
05BD 40             ORL    A,@R0
05BE A0             MOV    @R0,A
05BF EBBA           DJNZ   R3,ADDNEW

           ;L6 (VEND) EVENT COUNTING ROUTINE, ADD ONE TO EITHER THE
           ;TEST VEND COUNTER OR THE NORMAL EVENT COUNTER FOR ANY
           ;BIT FOUND ON IN ACBUF3.

05C1 F4AE  L6CNT:   CALL   DECODE
05C3 B6C6           JF0    TVMTST
05C5 83             RET
05C6 B8E6  TVMTST:  MOV    R0,#TVTIM        ;TEST FOR TEST VEND
05C8 80             MOVX   A,@R0            ;MINUTE IN PROGRESS
05C9 C6CF           JZ     INCFV
05CB B815           MOV    R0,#TVCNT +1     ;SPECIAL TEST VEND CNTR
05CD A4DB           JMP    ADD1

05CF 09    INCFV:   IN     A,P1
05D0 72D6           JB3    INCCNT  ;IF NO ACD GO COUNT VENDS
05D2 B817           MOV    R0,#FVCNT +1
05D4 F469           CALL   DBLINC

05D6 F9    INCCNT:  MOV    A,R1
05D7 E7             RL     A                ;TIMES 2
05D8 0319           ADD    A,#RAM +1        ;PLUS BASE ADDRESS
05DA A8             MOV    R0,A
05DB F469  ADD1:    CALL   DBLINC           ;DOUBLE BYTE INCREMENT
05DD A4C1           JMP    L6CNT


           ;EVENT COUNTING ROUTINE, ADD ONE TO THE APPROPRIATE
           ;COUNTER FOR ANY BIT FOUND ON IN ACBUF3.

05DF F4AE  EVCNT:   CALL   DECODE
05E1 B6E4           JF0    TVMT1
05E3 83             RET
05E4 B8E6  TVMT1:   MOV    R0,#TVTIM
05E6 80             MOVX   A,@R0
05E7 96DF           JNZ    EVCNT
05E9 F9    ADRESS:  MOV    A,R1
05EA E7             RL     A                ;TIMES 2
05EB 0319           ADD    A,#RAM +1        ;PLUS BASE ADDRESS
05ED A8             MOV    R0,A
05EE F469  ADDONE:  CALL   DBLINC           ;DOUBLE BYTE INCREMENT
05F0 A4DF           JMP    EVCNT

           ;JUST ON, IS DEFINED AS ON IN AC1.& AC2.& AC3. AND
           ;NOT ON IN THE "ON" REG. THIS IS ANDED WITH DATA IN
           ;ACBUF3.

05F2 B829  JUSTON:  MOV    R0,#ACINP1
05F4 F448           CALL   INTAND           ;ACBUF3 & AC1
05F6 F448           CALL   INTAND           ;& AC2
05F8 F448           CALL   INTAND           ;& AC3
05FA F454           CALL   INTNND           ;& NOT "ON"
05FC 83             RET


           $EJECT
```

```
0600                  ORG     600H

0600 B8E7    COUNTD:  MOV     R0,#INSTA1          ;COUNTED=1
0602 F42F             CALL    LONG                ;AND CNTD & LONG
0604 B8ED             MOV     R0,#INSTA3          ;REMOVE THE L6 PRIORS
0606 F43B             CALL    NAND3 -2
0608 B8F0             MOV     R0,#INSTA4          ;REMOVE THE L6 WITHINS
060A F43B             CALL    NAND3 -2
060C 84F2             CALL    JUSTON
060E A4DF             JMP     EVCNT



             ;PROCESS THE TIME/DURATION INPUTS, THEN UPDATE THE
             ;PREV. ON REGISTERS, THEN ENTER A WAIT ROUTINE
             ;WHOSE LENGTH VARIES TO KEEP TIS ROUTINE AT APPROX.
             ;4.2MS. THIS ROUTINE IS THE 4MS WAIT FOR ACIN1.

0610 B8EA    TIMED:   MOV     R0,#INSTA2          ;TIME & DURATION =1
0612 F42F             CALL    LONG                ;AND TIMDUR & LONG
0614 B832             MOV     R0,#ACINP1 +9
0616 F448             CALL    INTAND              ;AND "ON" & MASKS
0618 F4AE    TDLOOP:  CALL    DECODE              ;DECODE "ON'S"
061A B61E             JF0     STRTTD    ;GO START THE TIMER
061C C429             JMP     TDOFF     ;IF NO NEW ONS, TEST OFFS

061E D481    STRTTD:  CALL    TDADRS    ;ADDRESS THE TIMER BYTE
0620 80               MOVX    A,@R0
0621 4380             ORL     A,#80H              ;TIMER ACTIVE BIT
0623 90               MOVX    @R0,A               ;STORED
0624 18               INC     R0
0625 27               CLR     A
0626 90               MOVX    @R0,A     ;CLEAR THE "OFF" TIMER
0627 C418             JMP     TDLOOP

0629 B8EA    TDOFF:   MOV     R0,#INSTA2          ;TIME & DURATION =1
062B F42F             CALL    LONG                ;AND TIMDUR & LONG
062D B832             MOV     R0,#ACINP1 +9       ;ADDRESS "ON" REGISTER
062F F454             CALL    INTNND              ;AND "OFFS" & MASKS

0631 F4AE    TDOLOP:  CALL    DECODE              ;DECODE "ON'S"
0633 B637             JF0     STOPTD    ;GO STOP THE TIMER
0635 C445             JMP     UDPREV    ;IF NO NEW OFFS EXIT

0637 D481    STOPTD:  CALL    TDADRS
0639 80               MOVX    A,@R0
063A D23E             JB6     STPTD1    ;IF TIMER > 1MIN, JUMP
063C 27               CLR     A
063D 90               MOVX    @R0,A     ;CLEAR TIMER

063E 18      STPTD1:  INC     R0        ;OFF TIMER ADDRESS
063F 80               MOVX    A,@R0
0640 4380             ORL     A,#80H
0642 90               MOVX    @R0,A               ;STORED
0643 C431             JMP     TDOLOP


             ;UPDATE THE PREVIOUSLY ON REGISTERS
             ;IF "ON" IN ALL THREE BLOCKS SET THE BIT
             ;IF "OFF" IN ALL THREE RESET THE BIT

0645 B829    UDPREV:  MOV     R0,#ACINP1
0647 B903             MOV     R1,#03H             ;3 BYTES PER WORD
0649 BA03    SETLOP:  MOV     R2,#03H             ;3 WORDS PER *#%)&?
064B 23FF             MOV     A,#0FFH             ;SET FOR FIRST ANL
064D 50      ANLLOP:  ANL     A,@R0               ;AND THE WORDS
064E 18               INC     R0
064F 18               INC     R0
0650 18               INC     R0
0651 EA4D             DJNZ    R2,ANLLOP
0653 40               ORL     A,@R0               ;SET IN "ON" REG
```

```
0654 A0                  MOV    @R0,A
0655 F8                  MOV    A,R0
0656 03F8                ADD    A,#07H NOT      ;SUBTRACT 8
0658 A8                  MOV    R0,A            ;ADDRESS SET FOR NEXT
0659 E949                DJNZ   R1,SETLOP


065B B829        RSTBIT: MOV    R0,#ACINP1
065D B903                MOV    R1,#03H         ;3 BYTES PER WORD
065F BA03        RSTLOP: MOV    R2,#03H         ;3 WORDS PER *#%)&?
0661 2300                MOV    A,#00H          ;SET FOR FIRST ORL
0663 40          ORLLOP: ORL    A,@R0           ;OR THE WORDS
0664 18                  INC    R0
0665 18                  INC    R0
0666 18                  INC    R0
0667 EA63                DJNZ   R2,ORLLOP
0669 50                  ANL    A,@R0           ;RESET IN "ON" REG
066A A0                  MOV    @R0,A
066B F8                  MOV    A,R0
066C 03F8                ADD    A,#07H NOT      ;SUBTRACT 8
066E A8                  MOV    R0,A            ;ADDRESS SET FOR NEXT
066F E95F                DJNZ   R1,RSTLOP


                 ;VARIABLE LENGTH WAIT ROUTINE. WAIT 20-(#OF T/D LINES)
                 ; * 160US.

0671 B8DF        VLWAIT: MOV    R0,#TIMDUR
0673 80                  MOVX   A,@R0           ;# OF TIME/DUR LINES
0674 37                  CPL    A               ;SET UP TO
0675 0315                ADD    A,#21D          ;SUBTRACT FROM 20
0677 C680                JZ     EXVLW           ;EXIT IF ZERO
0679 A9                  MOV    R1,A
067A B81E        VLWLP1: MOV    R0,#30D
067C E87C        VLWLP2: DJNZ   R0,VLWLP2
067E E97A                DJNZ   R1,VLWLP1
0680 83          EXVLW:  RET




0681 B8DE        TDADRS: MOV    R0,#CNTED       ;ADDRESS # OF COUNTEDS
0683 80                  MOVX   A,@R0           ;# OF COUNTED LINES
0684 E7                  RL     A               ;TIMES 2
0685 0321                ADD    A,#RAM +9       ;ADD IN START ADDRESS
0687 AA                  MOV    R2,A            ;SAVE IN R0

0688 80                  MOVX   A,@R0           ;# OF COUNTED LINES (C#)
0689 37          CPLA:   CPL    A               ;PREP. FOR SUBTRACTION
068A 69                  ADD    A,R1            ;TIMDUR LINE # (TDN#)
068B 17                  INC    A               ;ACC.=(TDN#-C#+1)
068C A9                  MOV    R1,A
068D BB0A                MOV    R3,#10D
068F 69          TIMS10: ADD    A,R1
0690 EB8F                DJNZ   R3,TIMS10
                                                ;ACC.=11*(TDN#-(C#+1))
0692 6A                  ADD    A,R2            ;PLUS BASE
0693 A8                  MOV    R0,A            ;IN R0
0694 83                  RET


                 ;LOOP8, TRANSFER DATA FROM @R1 TO @R0  R2 TIMES.
0695 BA03                MOV    R2,#03H         ;3 BYTES TO MOVE
0697 F1          LOOP8:  MOV    A,@R1
0698 A0                  MOV    @R0,A
0699 C8                  DEC    R0
069A C9                  DEC    R1
069B EA97                DJNZ   R2,LOOP8
069D 83                  RET
```

```
069E B8C8    FOURMS: MOV    R0,#200D          ;4 MS WAIT ROUTINE
06A0 09      FOURLP: IN     A,P1              ;1 BYTE 2 CYCLE INSTR.
06A1 09              IN     A,P1
06A2 09              IN     A,P1
06A3 E8A0            DJNZ   R0,FOURLP
06A5 83              RET
             $EJECT
             ;READ THE A.C. INPUTS
06A6 BB08    READAC: MOV    R3,#08H           ;8 TRIES MAX.
06A8 B823    RLOOP1: MOV    R0,#ACBUF2        ;A.C.INPUT BUFFER 2
06AA D4E9            CALL   READ
06AC B820            MOV    R0,#ACBUF1        ;A.C. INPUT BUFFER 1
06AE D4E9            CALL   READ
06B0 B820            MOV    R0,#ACBUF1
06B2 B923            MOV    R1,#ACBUF2
06B4 F400            CALL   XORTST
06B6 C6C5            JZ     NONC     ;GO ADJUST FOR N.O./N.C. MASK
06B8 EBA8            DJNZ   R3,RLOOP1
06BA B820            MOV    R0,#ACBUF1        ;CLEAR BUFFER 1 IF NO
06BC BB03            MOV    R3,#03H           ;TWO READS MATCH
06BE B000    CLRLP:  MOV    @R0,#00H
06C0 18              INC    R0
06C1 EBBE            DJNZ   R3,CLRLP
06C3 C4E4            JMP    EXREAD
             ;INTERPET THE READ ACCORDING TO THE N.O./N.C. MASK
             ;IE. AN 'ON' INPUT IS OUT OF ITS 'NORMAL' STATE.
06C5 B8F9    NONC:   MOV    R0,#INSTA7        ;N.O./N.C. MASK
06C7 B920            MOV    R1,#ACBUF1        ;AND THE MASK & ACBUF1
06C9 F41F            CALL   AND3
                                              ;ACBUF2
06CB B8F9            MOV    R0,#INSTA7        ;AND THE COMPLEMENT OF
06CD BB03            MOV    R3,#03H
06CF 80      NCLOOP: MOVX   A,@R0             ;THE MASK WITH THE COM-
06D0 41              ORL    A,@R1             ;PLEMENT OF ACBUF2 (IE.
06D1 37              CPL    A                 ;ORL & CPL) TO CREATE
06D2 A1              MOV    @R1,A             ;N.C. INPUTS IN BUFFER.
06D3 18              INC    R0
06D4 19              INC    R1
06D5 EBCF            DJNZ   R3,NCLOOP
06D7 B820            MOV    R0,#ACBUF1        ;OR THE N.O.(BUF1) WITH
06D9 B923            MOV    R1,#ACBUF2        ;THE N.C.(BUF2) TO CREATE
06DB BB03            MOV    R3,#03H
06DD F0      ORLOOP: MOV    A,@R0             ;'ON' INPUTS IN BUF1.
06DE 41              ORL    A,@R1
06DF A0              MOV    @R0,A
06E0 18              INC    R0
06E1 19              INC    R1
06E2 EBDD            DJNZ   R3,ORLOOP
06E4 B8F3    EXREAD: MOV    R0,#INSTA5        ;L1/L2 STATUS
06E6 B920            MOV    R1,#ACBUF1
06E8 83              RET
06E9 8A80    READ:   ORL    P2,#XRAMCS        ;SELECT I/O
```

```
06EB 97                 CLR     C
06EC B904               MOV     R1,#04H          ;3RD INPUT BUFFER ADRS
06EE 81         READ1:  MOVX    A,@R1
06EF A0                 MOV     @R0,A
06F0 18                 INC     R0
06F1 F9                 MOV     A,R1
06F2 67                 RRC     A       ;ROTATE ADDRESS BIT RIGHT
06F3 A9                 MOV     R1,A
06F4 96EE               JNZ     READ1
06F6 9A7F               ANL     P2,#XRAMCS NOT   ;SELECT XRAM
06F8 83                 RET

                $EJECT

0700                    ORG     700H

                ;XORTST, XOR TWO THREE BYTE WORDS. RETURN WITH ACC.=0
                ;FOR IDENTICAL WORDS AND ACC.=NON 0 IF NOT.

0700 BA03       XORTST: MOV     R2,#03H          ;TRIPLE BYTE TEST
0702 F0         XORT1:  MOV     A,@R0
0703 D1                 XRL     A,@R1
0704 960A               JNZ     NOMTCH           ;IF NOT 0, EXIT
0706 18                 INC     R0
0707 19                 INC     R1
0708 EA02               DJNZ    R2,XORT1
070A 83         NOMTCH: RET


                ;AND TOGETHER THE "SHORT" MASK WITH EITHER THE L6 WITHIN
                ;OR THE L6 PRIOR MASK LEAVING THE RESULT IN ACBUF3.

070B B8F0       WTHSRT: MOV     R0,#INSTA4       ;L6 WITHIN = 1
070D E411               JMP     SHORT

070F B8ED       PRSHRT: MOV     R0,#INSTA3       ;L6 PRIOR = 1
0711 B926       SHORT:  MOV     R1,#ACBUF3       ;INT. RAM WORKING REG.
0713 BB03               MOV     R3,#03H
0715 80         SLOOP:  MOVX    A,@R0
0716 A1                 MOV     @R1,A
0717 18                 INC     R0
0718 19                 INC     R1
0719 EB15               DJNZ    R3,SLOOP

                ;AND3, AND TOGETHER TWO THREE BYTE WORDS @R0 EXT. & @R1
                ;INT. LEAVE RESULT @R1.
071B B8F6               MOV     R0,#INSTA6       ;SHORT = 1
071D B926               MOV     R1,#ACBUF3
071F BB03       AND3:   MOV     R3,#03H          ;TRIPLE BYTE OPERATION
0721 80         ANDLP:  MOVX    A,@R0
0722 51                 ANL     A,@R1
0723 A1                 MOV     @R1,A
0724 18                 INC     R0
0725 19                 INC     R1
0726 EB21               DJNZ    R3,ANDLP
0728 83                 RET


                ;AND TOGETHER THE "LONG" MASK WITH EITHER THE L6 WITHIN
                ;OR THE L6 PRIOR MASK LEAVING THE RESULT IN ACBUF3.

0729 B8F0       WTHLNG: MOV     R0,#INSTA4       ;L6 WITHIN = 1
072B E42F               JMP     LONG

072D B8ED       PRLONG: MOV     R0,#INSTA3       ;L6 PRIOR = 1
072F B926       LONG:   MOV     R1,#ACBUF3       ;INT. RAM WORKING REG.
0731 BB03               MOV     R3,#03H
0733 80         LLOOP:  MOVX    A,@R0
0734 A1                 MOV     @R1,A
```

```
0735 18                      INC     R0
0736 19                      INC     R1
0737 EB33                    DJNZ    R3,LLOOP

               ;NAND3, AND TOGETHER TWO THREE BYTE WORDS, NOT @R0 EXT.
               ;& @R1 INT.  LEAVE RESULT @R1.
0739 B8F6                    MOV     R0,#INSTA6       ;SHRT/LNG, LONG = 0
073B B926                    MOV     R1,#ACBUF3
073D BB03      NAND3:        MOV     R3,#03H ;AND THE NOT @R1 WITH @R0
073F 80        NAND:         MOVX    A,@R0
0740 37                      CPL     A
0741 51                      ANL     A,@R1
0742 A1                      MOV     @R1,A
0743 18                      INC     R0
0744 19                      INC     R1
0745 EB3F                    DJNZ    R3,NAND
0747 83                      RET
               $EJECT



               ;INTERNAL RAM AND ROUTINE, AND ACBUF3 (@R1) WITH THE
               ;WORD @R0. LEAVE THE RESULT IN ACBUF3.

0748 B926      INTAND:       MOV     R1,#ACBUF3
074A BB03                    MOV     R3,#03
074C F0        IALOOP:       MOV     A,@R0
074D 51                      ANL     A,@R1
074E A1                      MOV     @R1,A
074F 18                      INC     R0
0750 19                      INC     R1
0751 EB4C                    DJNZ    R3,IALOOP
0753 83                      RET


               ;INTERNAL RAM NAND ROUTINE, AND ACBUF3 (@R1) WITH THE
               ;NOT WORD @R0. LEAVE THE RESULT IN ACBUF3.

0754 B926      INTNND:       MOV     R1,#ACBUF3
0756 BB03                    MOV     R3,#03
0758 F0        INLOOP:       MOV     A,@R0
0759 37                      CPL     A
075A 51                      ANL     A,@R1
075B A1                      MOV     @R1,A
075C 18                      INC     R0
075D 19                      INC     R1
075E EB58                    DJNZ    R3,INLOOP
0760 83                      RET



               ;MULTI BYTE ADD ROUTINE, ADD THE ACC. TO THE VALUE
               ;@R0.

0761 15        TRIPAD:       DIS     I          ;60US MAX.
0762 AA                      MOV     R2,A       ;TEMP. SAVE
0763 80                      MOVX    A,@R0
0764 6A                      ADD     A,R2
0765 90                      MOVX    @R0,A
0766 E673                    JNC     EXADD
0768 C8                      DEC     R0
0769 15        DBLINC:       DIS     I
076A 80                      MOVX    A,@R0
076B 0301                    ADD     A,#01H
076D 90                      MOVX    @R0,A
076E C8                      DEC     R0
076F 80                      MOVX    A,@R0
0770 1300                    ADDC    A,#00H
0772 90                      MOVX    @R0,A
0773 05        EXADD:        EN      I
0774 83                      RET
```

```
$EJECT


;TEST THE CASH COUNTER INPUT

0775 B83E    CCTV:    MOV     R0,#CCCNT        ;CASH COUNTER COUNTER
0777 BA03    CCTST:   MOV     R2,#03H
0779 262F             JNT0    CCDR2    ;CASH CNTR ON, GO DEC R2
077B B002             MOV     @R0,#02H         ;IF OFF RELOAD CNTR
077D E493             JMP     TVSTST           ;GO TEST TEST VEND SW.
077F EA79    CCDR2:   DJNZ    R2,CCTST +2

0781 F0      CCON:    MOV     A,@R0            ;GET CCCNT
0782 C693             JZ      TVSTST   ;THIS "ON" ALREADY COUNTED
0784 07               DEC     A
0785 A0               MOV     @R0,A    ;SAVE
0786 9693             JNZ     TVSTST   ;NOT YET ENOUGH CYCLES

0788 B8E6             MOV     R0,#TVTIM        ;TEST VEND TIMER
078A 80               MOVX    A,@R0            ;IF NOT ZERO DON'T COUNT
078B 9693             JNZ     TVSTST

078D B809             MOV     R0,#VNDCSH +2    ;ADD NICKEL TO CASH
078F 2301             MOV     A,#01D
0791 F461             CALL    TRIPAD           ;CALL TRIPLE ADD ROUTINE

;TEST THE TEST VEND SWITCH

0793 B83F    TVSTST:  MOV     R0,#TVSCNT       ;TEST VEND SWITCH COUNTER
0795 BA03             MOV     R2,#03H
0797 09      TVTST1:  IN      A,P1
0798 37               CPL     A
0799 529F             JB2     TVDR2
079B B003             MOV     @R0,#03H         ;IF OFF RELOAD CNTR
079D E4AD             JMP     EXCCTV           ;EXIT
079F EA97    TVDR2:   DJNZ    R2,TVTST1

07A1 F0      TVON:    MOV     A,@R0            ;GET CCCNT
07A2 C6AD             JZ      EXCCTV   ;THIS "ON" ALREADY COUNTED, EXIT
07A4 07               DEC     A
07A5 A0               MOV     @R0,A    ;SAVE
07A6 96AD             JNZ     EXCCTV   ;NOT YET ENOUGH CYCLES, EXIT

07A8 B8E6             MOV     R0,#TVTIM        ;ONE MIN. TV TIMER
07AA 230A             MOV     A,#10D           ;10 * 6SEC.= 1MIN.
07AC 90               MOVX    @R0,A
07AD 83      EXCCTV:  RET


$EJECT

;DECODE, DECODE THE CONTENTS OF ACBUF3.
;FOR EACH BIT FOUND TO BE A ONE EXECUTE A RETURN
;WITH THE BIT LOCATION DEFINED AS A BINARY NUMBER
;IN R1 (0 TO 23). USE FLAG 0 TO INDICATE WHETHER OR
;NOT A BIT WAS FOUND (1=FOUND).
;ADDITIONALLY EACH BIT FOUND MUST BE REMOVED SO THAT IT
;WILL NOT BE COUNTED UPON RE-ENTERING THIS ROUTINE.
;THIS ROUTINE IS LONG ON CODE BUT SHORT ON TIME SINCE
;IT MAY BE ENTERED 24 TIMES PER AC READ.

;37.5US TO 117.5US PER RE-ENTER.  1.86MS FOR 24 TIMES.

07AE B900    DECODE:  MOV     R1,#00H
07B0 85               CLR     F0
07B1 B826             MOV     R0,#ACBUF3
```

```
07B3 F0                     MOV    A,@R0
07B4 96C3                   JNZ    BITTST
07B6 B908                   MOV    R1,#08
07B8 18                     INC    R0
07B9 F0                     MOV    A,@R0
07BA 96C3                   JNZ    BITTST
07BC B910                   MOV    R1,#10H
07BE 18                     INC    R0
07BF F0                     MOV    A,@R0
07C0 96C3                   JNZ    BITTST
07C2 83                     RET

07C3 95          BITTST:    CPL    F0
07C4 F2F5                   JB7    FOUND1
07C6 19                     INC    R1
07C7 D2F1                   JB6    FOUND2
07C9 19                     INC    R1
07CA B2ED                   JB5    FOUND3
07CC 19                     INC    R1
07CD 92E9                   JB4    FOUND4
07CF 19                     INC    R1
07D0 72E5                   JB3    FOUND5
07D2 19                     INC    R1
07D3 52E1                   JB2    FOUND6
07D5 19                     INC    R1
07D6 32DD                   JB1    FOUND7
07D8 19                     INC    R1

07D9 53FE        FOUND8:    ANL    A,#01H NOT
07DB A0                     MOV    @R0,A
07DC 83                     RET
07DD 53FD        FOUND7:    ANL    A,#02H NOT
07DF A0                     MOV    @R0,A
07E0 83                     RET
07E1 53FB        FOUND6:    ANL    A,#04H NOT
07E3 A0                     MOV    @R0,A
07E4 83                     RET
07E5 53F7        FOUND5:    ANL    A,#08H NOT
07E7 A0                     MOV    @R0,A
07E8 83                     RET
07E9 53EF        FOUND4:    ANL    A,#10H NOT
07EB A0                     MOV    @R0,A
07EC 83                     RET
07ED 53DF        FOUND3:    ANL    A,#20H NOT
07EF A0                     MOV    @R0,A
07F0 83                     RET
07F1 53BF        FOUND2:    ANL    A,#40H NOT
07F3 A0                     MOV    @R0,A
07F4 83                     RET
07F5 537F        FOUND1:    ANL    A,#80H NOT
07F7 A0                     MOV    @R0,A
07F8 83                     RET


                 $EJECT
```

```
LOC  OBJ      LINE      SOURCE STATEMENT

0000          1995      END     RESET

USER SYMBOLS
ACBUF1 0020  ACBUF2 0023  ACBUF3 0026  ACDBUF 003B  ACDBUS 0001  ACDCNT 003D  ACDTNH 0020  ACDFM  00FD
ACDREC 0032  ACIN1  0500  ACIN1A 0504  ACIN2  0515  ACIN2A 0510  ACINF1 0029  ACK    0001  ACFCNT 0030
ACUHRT 0135  ACTIVE 0471  ADD1   05DB  ADDNEW 05BA  ADDONE 05EE  ADJFUL 0209  ADRESS 05E9  AND3   071F
ANDLP  0721  ANLLOP 064D  BOTST  0546  B5TST  01E2  B7TST  0237  BITTST 07C3  BOXCSH 000A  BUFTST 0160
C1SEC  041B  C60HZ  0404  CALLSN 01B1  CALTST 0250  CCCNT  003E  CCDF2  077F  CCON   0781  CCTST  0777
CCTV   0775  CHKBCC 0175  CLRBUF 036A  CLRIT  0465  CLRLOP 05AF  CLRLP  06BE  CLRSHT 05AA  CNT10M 0483
CNT1M  0484  CNT1S  0486  CNT6S  0485  CNTED  00DF  CNTLOP 0542  CNVTM  072F  CNVTM1 0233  COMB12 0521
COMBLP 0527  COMPAR 03B7  COMSTA 003F  COUNT  00DD  COUNTD 0600  CPLA   06B9  CPLLED 040B  CRC    02C8
CRC16  0374  CRCLP  02CA  CSACK  0245  CSHBOX 00A7  CSHVND 00BC  CTST   002E  DATBUF 0018  DBLINC 0769
DCB1   016C  DCB2   016F  DCB3   0171  DCD1   007D  DCDACD 0060  DECCNT 004D  DECLD  0096  DECLOP 0424
DECODE 07AE  DILOOP 044A  DLE    0090  DUMP   0274  DURINC 043E  ELPSTM 0012  ELTIM  042C  ENQ    0005
ERR1   01A6  ERREXT 005E  ERRJMP 0164  EVCNT  05DF  EXAC2  055B  EXADD  0773  EXCCTV 07AD  EXEC   0400
EXEC1  04CE  EXEC2  04DE  EXELTM 043D  EXINC  04CB  EXITAC 0514  EXL6   05B3  EXRACD 011F  EXREAD 06E4
EXTACD 00C6  EXVLW  0680  FOUND1 07F5  FOUND2 07F1  FOUND3 07ED  FOUND4 07E9  FOUND5 07E5  FOUND6 07E1
FOUND7 07DD  FOUND8 07D9  FOURLP 06A0  FOURMS 069E  FSTEXT 00BF  FULBIT 02D5  FVCNT  0016  HEADER 0269
HLFBIT 02E1  HRTST  0480  IALOOP 074C  INCCNT 05D6  INCDUR 04B6  INCFV  05CF  INCINT 0254  INCSCL 04C1
INIT   000D  INIT1  0025  INLOOP 0758  INSTA1 00E7  INSTA2 00EA  INSTA3 00ED  INSTA4 00F0  INSTA5 00F3
INSTA6 00F6  INSTA7 00F9  INTAND 0748  INTCNT 0010  INTNND 0754  INTR   0003  INTRSV 0100  JMPEXC 0567
JMPRST 0247  JUSTON 05F2  KILSHT 059D  L6CNT  05C1  L6EVNT 0569  L6LOOP 056D  L6PL   0579  L6PS   0581
L6WL   058F  L6WS   0595  LD1SEC 033E  LDCNTR 0340  LDDATA 021D  LDFULL 02DA  LDHALF 02E5  LDMASK 0223
LDOSEC 0345  LDTIME 02DC  LDVAL  0358  LLOOP  0733  LNKINH 0040  LNKREC 0010  LNKTST 0140  LNKXMT 0010
LOAD3  021F  LOADR3 00CC  LONG   072F  LOOP1  0012  LOOP11 0151  LOOP18 036E  LOOP2  0017  LOOP8  0697
LOOP9  0249  LSTMES 0080  MOVLOP 050E  MPJER1 021B  MPJRDM 01E6  NACK   0002  NAND   073F  NAND3  073D
NCLOOP 06CF  NEGEDG 00CA  NEWBIT 0053  NEWLOP 03C7  NEXTD  044D  NEXTD1 0442  NEXTD2 0469  NOMTCH 070A
NONC   06C5  NXTBIT 02BF  NXTDEC 042A  NXTRLD 04DA  ONEMTN 00E2  ONESEC 00E0  OPLED  0002  OPLLOP 0663
ORLOOP 06DD  OUT0   02E9  OUT01  02EB  OUT1   02BD  PRLONG 072D  PROCAC 055C  PROCM  01E5  PRSHRT 070F
PSHLOP 04A0  PUSH   0496  RALFFT 023A  RAM    0018  RDATAM 0200  READ   06E9  READ1  06EE  READAC 06A6
RECACD 0115  RECBIT 0047  RECLNK 0139  RECLOP 014B  RENOM  01B9  RESET  0000  RET3   033D  RETNI  0110
RLDDBL 04E2  RLDLOP 04D4  RLOOP1 06AB  RNACK  01D8  ROTACC 0549  ROTATE 0385  RSTBIT 065B  RSTBUF 00E1
RSTLOP 065F  RSTRT  01D4  RSTIMR 04B3  RSTXBF 00AD  RTSBIT 014E  SACK   031C  SAVE1  0508  SAVNEW 0075
SCALE  0477  SDATAM 0259  SECCOD 0001  SERNO  0004  SETLOP 0649  SETUP  019B  SETRST 012F  SHORT  0711
SIXMIN 00E4  SIXSEC 00E1  SLOOP  0715  SLPCNT 0011  SLPTIM 00E5  SNACK  0322  SNDBCC 0293  SNDCNT 027B
SNDCOM 032B  SNDLOP 032D  SNDSTK 0278  SNDTMD 0286  SOH    0081  SRT    0006  SSTACK 0300  STCK   0007
STORRY 037D  STOCK  0014  STOPBT 005B  STOPTD 0637  STPBIT 0141  STPTD1 063E  STRNEW 0555  STRTBT 003F
STRTC  0342  STRTT  02DE  STRTTD 061E  STRTWT 0190  STUPWT 0295  TITST1 00D2  TITST2 00D8  TITST3 0517
TDADRS 0681  TDLOOP 0618  TDOFF  0629  TDOLOP 0631  TENMIN 00E3  TFTST  0339  TIMDUR 00DF  TIMED  0610
TIMER1 0004  TIMER2 0009  TIMS10 069F  TINTR  0007  TMDLOP 029B  TRIPAD 0761  TSTBIT 0192  TSTERR 035E
TSTINT 0129  TSTLOP 034B  TSTRST 0121  TSTSW  0004  TSTXRM 0349  TVCNT  0014  TVDR2  079F  TVMT1  05E4
TVMTST 05C6  TVON   07A1  TVSCNT 003F  TVSTST 0793  TVTTM  00E6  TVTST1 0797  UDPCNT 05B4  UDPREV 0645
UDSHRT 0536  VALBYT 005A  VALCHK 0363  VALID  00FC  VERCDE 03B0  VLWAIT 0671  VLWLP1 067A  VLWLP2 0670
VNDCNT 000D  VNDCSH 0007  WAIT1  014C  WAIT10 0335  WAIT2  01AD  WITHIN 0589  WRONG  038B  WITHLN 0729
WTFSRT 070B  XMIT6  030A  XMITI  029C  XMITX  02A6  XMTBCC 0310  XMTCOM 02AD  XMTDI  0299  XMTDX  02A3
XMTLOP 02B4  XORT1  0702  XORTST 0700  XRAMCS 0080

ASSEMBLY COMPLETE,   NO ERRORS
```

I claim:

1. A programmable accountability apparatus for installation and use with any of a plurality of particular types of vending machines for monitoring vending functions without rewiring the vending machine in which it is installed, comprising:

a plurality of monitoring wires attachable to a plurality of points within the vending machine which carry AC signals and which have been selected for monitoring, means for converting the AC signals to digital signals, a microprocessor programmed to monitor and collect data from the digital signals, memory, operatively associated with the microprocessor, for storing data collected from the digital signals, a fixed operating program, and program data for programming the microprocessor, said program data comprising a selected digital word comprising a plurality of bits for each of the plurality of monitoring wires, the bits of the word selected for each such wire determining the data to be collected and stored by the microprocessor upon the occurrence of the AC signal monitored by that wire, the program data serving to adapt the accountability apparatus for each particular type of vending machine.

2. The accountability apparatus of claim 1 wherein the data collected by the microprocessor upon the occurrence of the AC signal on a monitoring wire indicates either the count, time or duration of the AC signal.

3. The accountability apparatus of claim 1 further comprising an interface circuit for receiving a digital signal from the vending machine's coinage mechanism, wherein the microprocessor stores data from this signal indicating the total cash value of completed vends.

4. The accountability apparatus of claim 3 wherein the data stored from the signal from the vending machine's coinage mechanism also indicates the value of coins directed to the cash box.

5. The accountability apparatus of claim 1 wherein the number of monitoring wires is sixteen.

6. The accountability apparatus of claim 1 wherein the number of monitoring wires is twenty-four.

7. The accountability apparatus of claim 2 wherein the selected digital word for each monitoring wire comprises eight bits.

8. The accountability apparatus of claim 7 wherein one bit of the selected digital word determines whether the occurrence of the AC signal is to be counted, a second bit determines whether the occurrence of the AC signal is to be timed, a third bit determines whether the occurrence of the AC signal is to be both timed and measured in duration, a fourth bit indicates whether the AC signal occurs before the vend-in-progress signal from the vending machine, a fifth bit indicates whether the AC signal occurs after the vend-in-progress signal from the vending machine, a sixth bit indicates whether the AC signal is of short or long duration, a seventh bit indicates whether the AC signal is normally absent or normally present, and an eighth bit indicates whether the AC signal is referenced to the first or second positive half-cycle of the primary AC signal powering the vending machine.

9. The accountability apparatus of claim 2 wherein the selected digital word for each monitoring wire comprises seven bits.

10. The accountability apparatus of claim 9 wherein one bit of the selected digital word determines whether the occurrence of the AC signal is to be counted, a second bit determines whether the occurrence of the AC signal is to be both timed and measured in duration, a third bit indicates whether the AC signal occurs before the vend-in-progress signal from the vending machine, a fourth bit indicates whether the AC signal occurs after the vend-in-progress signal from the vending machine, a fifth bit indicates whether the AC signal is of short or long duration, a sixth bit indicates whether the AC signal is normally absent or normally present, and a seventh bit indicates whether the AC signal is referenced to the first or second positive half-cycle of the primary AC signal powering the vending machine.

11. The accountability apparatus of claim 1 wherein the digital words for programming the microprocessor are transmitted into the memory as a series of hexadecimal characters.

12. The accountability apparatus of claim 1 wherein the data collected from the wires monitoring AC signals are stored in assigned fields of variable length in the memory.

13. The accountability apparatus of claim 12 wherein one memory field is assigned to store data collected from wires monitoring AC signals whose occurrences are counted and a second memory field is assigned to store data collected from wires monitoring AC signals whose occurrences are both timed and measured in duration.

14. The accountability apparatus of claim 13 wherein a third memory field is assigned to store data collected from wires monitoring AC signals whose occurrences are timed.

15. The accountability apparatus of claim 13 or 14 further comprising a monitored-data storage field in memory of fixed length.

16. The accountability apparatus of claim 13 wherein the data collected from each wire monitoring AC signals whose occurrences are counted are stored as four hexadecimal characters, and the data collected from each wire monitoring AC signals whose occurrences are both timed and measured in duration are stored as eighteen hexadecimal characters.

17. The accountability apparatus of claim 14 wherein the data collected from each wire monitoring AC signals whose occurrences are counted are stored as four hexadecimal characters, the data collected from each wire monitoring AC signals whose occurrances are timed are stored as twelve hexadecimal characters, and the data collected from each wire monitoring signals whose occurrences are both timed and measured in duration are stored as eighteen hexadecimal characters.

18. The accountability apparatus of claim 16 or 17 wherein the data stored from wires monitoring AC signals whose occurrences are both timed and measured in duration comprises data indicating the time and duration for the most recent three occurrences of the signal on each wire, wherein the time for each occurrence is stored as four hexadecimal characters and the duration of each occurrence is stored as two hexadecimal characters.

19. The accountability apparatus of claim 17 wherein the data stored from wires monitoring AC signals whose occurrences are timed comprises data indicating the time of the most recent three occurrences of the signal on each wire, wherein the time of each occurrence is stored as four hexadecimal characters.

* * * * *

UNITED STATES PATENT AND TRADEMARK OFFICE

CERTIFICATE OF CORRECTION

PATENT NO. : 4,520,451

DATED : May 28, 1985

INVENTOR(S) : Donald L. McLaughlin

It is certified that error appears in the above-identified patent and that said Letters Patent is hereby corrected as shown below:

Col. 2, line 56, after "zero" insert --volts--.

Col. 3, line 46, after "section" insert --of--;

line 67, after "other" insert --output--.

Signed and Sealed this

*Eighth* Day of *October 1985*

[SEAL]

*Attest:*

DONALD J. QUIGG

*Attesting Officer*

*Commissioner of Patents and Trademarks—Designate*